United States Patent
Haid et al.

(10) Patent No.: US 10,216,598 B2
(45) Date of Patent: Feb. 26, 2019

(54) METHOD FOR DIRTY-PAGE TRACKING AND FULL MEMORY MIRRORING REDUNDANCY IN A FAULT-TOLERANT SERVER

(71) Applicant: Stratus Technologies Bermuda Ltd., Hamilton (BM)

(72) Inventors: Steven Michael Haid, Bolton, MA (US); John Rogers MacLeod, Cambridge, MA (US)

(73) Assignee: Stratus Technologies Bermuda LTD., Hamilton (BM)

( * ) Notice: Subject to any disclaimer, the term of this patent is extended or adjusted under 35 U.S.C. 154(b) by 108 days.

(21) Appl. No.: 15/646,769

(22) Filed: Jul. 11, 2017

(65) Prior Publication Data
US 2019/0018746 A1  Jan. 17, 2019

(51) Int. Cl.
  *G06F 11/00* (2006.01)
  *G06F 11/20* (2006.01)
  *G06F 11/14* (2006.01)

(52) U.S. Cl.
  CPC ...... *G06F 11/2097* (2013.01); *G06F 11/1438* (2013.01); *G06F 11/1451* (2013.01);
  (Continued)

(58) Field of Classification Search
  CPC ............. G06F 11/1438; G06F 11/1451; G06F 11/1482; G06F 11/203; G06F 11/2097
  See application file for complete search history.

(56) References Cited

U.S. PATENT DOCUMENTS

2002/0116555 A1* 8/2002 Somers .................. G06F 13/28
                                                    710/26
2003/0212864 A1* 11/2003 Hicken ............... G06F 11/2092
                                                    711/122
(Continued)

OTHER PUBLICATIONS

Ben-Yehuda et al., "The Turtles Project: Design and Implementation of Nested Virtualization" https://www.usenix.org/conference/osdi10/turtles-project-design-and-implementation-nested-virtualization https://www.usenix.org/legacy/event/osdi10/tech/full_papers/Ben-Yehuda.pdf Downloaded Jul. 13, 2017.
(Continued)

*Primary Examiner* — Joshua P Lottich
(74) *Attorney, Agent, or Firm* — K&L Gates LLP

(57) ABSTRACT

A method of transferring memory from an active to a standby memory in an FT Server system. The method includes the steps of: reserving a portion of memory using BIOS; loading and initializing an FT Kernel Mode Driver; loading and initializing an FT Virtual Machine Manager (FTVMM) including the Second Level Address Translation table SLAT into the reserved memory. In another embodiment, the method includes tracking memory accesses using the FTVMM's SLAT in Reserved Memory and tracking "L2" Guest memory accesses by tracking the current Guest's SLAT and intercepting the Hypervisor's writes to the SLAT. In yet another embodiment, the method includes entering Brownout by collecting the D-Bits; invalidating the processor's cached SLAT translation entries, and copying the dirtied pages from the active memory to memory in the second Subsystem. In one embodiment, the method includes entering Blackout and moving the final dirty pages from active to the mirror memory.

17 Claims, 28 Drawing Sheets

(52) U.S. Cl.
CPC ........ *G06F 11/1482* (2013.01); *G06F 11/203* (2013.01); *G06F 2212/152* (2013.01)

(56) References Cited

U.S. PATENT DOCUMENTS

| | | | | |
|---|---|---|---|---|
| 2006/0117300 | A1* | 6/2006 | Puthukattukaran | G06F 11/1658 717/124 |
| 2015/0058295 | A1* | 2/2015 | Veeraraghavan ... | G06F 11/1451 707/649 |
| 2015/0082304 | A1* | 3/2015 | Hepkin .................. | G06F 21/53 718/1 |
| 2015/0095585 | A1* | 4/2015 | Subrahmanyam .... | G06F 3/0647 711/135 |
| 2015/0205688 | A1* | 7/2015 | Haid ................... | G06F 11/1484 709/212 |
| 2015/0370596 | A1* | 12/2015 | Fahs ........................ | G06F 9/46 718/1 |
| 2018/0300204 | A1* | 10/2018 | Amirishetty ........ | G06F 11/1469 |

OTHER PUBLICATIONS

Das et al., "Nested Virtualization State of the art and future directions," Oct. 2014 http://events.linuxfoundation.org/sites/events/files/slides/NestedVirtualization.pdf.

Wasserman, "Nested virtualization: shadow turtles," KVM forum Oct. 2013 http://www.linux-kvm.org/images/e/e9/Kvm-forum-2013-nested-virtualization-shadow-turtles.pdf.

Po-Jui Tsao et al., "Low Latency Virtualization-based Fault Tolerance", ICT Journal No. 166, Jun. 1, 2016 (Jun. 1, 2016), pp. 68-75, XP055515220.

Zhenhao Pan et al., "NestCloud: Towards Practical Nested Virtualization", Cloud and Service Computing (CSC), 2011 International Conference On, IEEE, Dec. 12, 2011 (Dec. 12, 2011), pp. 321-329, XP032102720.

Daniel J. Scales et al., "The Design of a Practical System for Fault-Tolerant Virtual Machines", Operating Systems Review, ACM, New York, NY, US, vol 44, No. 4, Dec. 13, 2010 (Dec. 13, 2010), pp. 30-39, XP058183107.

Harvard Research Group et al., "HRG Assessment: Stratus everRun® Enterprise", Documents of Harvard Research Group, Jan. 1, 2014 (Jan. 1, 2014), pp. 1-7, XP055517031.

Fujitsu, "Virtualization at Fujitsu", Fujitsu White Papers, Mar. 31, 2011 (Mar. 31, 2011), pp. 1-32, XP055516739.

Martin Land, "Virtual Machines", Modern Microprocessors, Fall 2012, Jan. 1, 2012 (Jan. 1, 2012), pp. 1-14, XP055516087.

PCT International Search Report and Written Opinion of International Searching Authority for International Patent Application No. PCT/US2018/039390, dated Nov. 6, 2018, 18 pages.

* cited by examiner

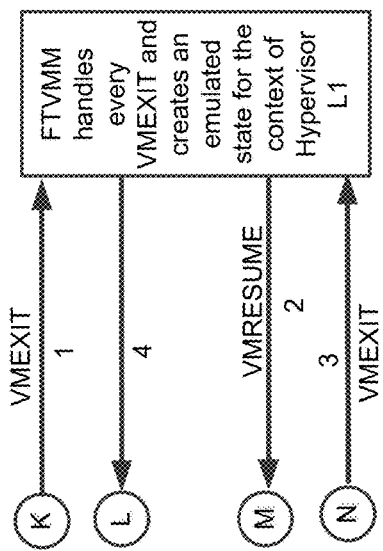
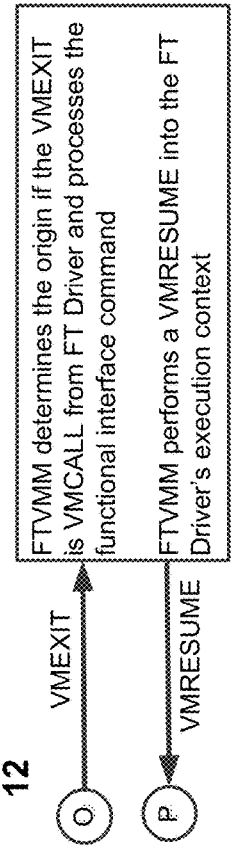
FIG. 3J

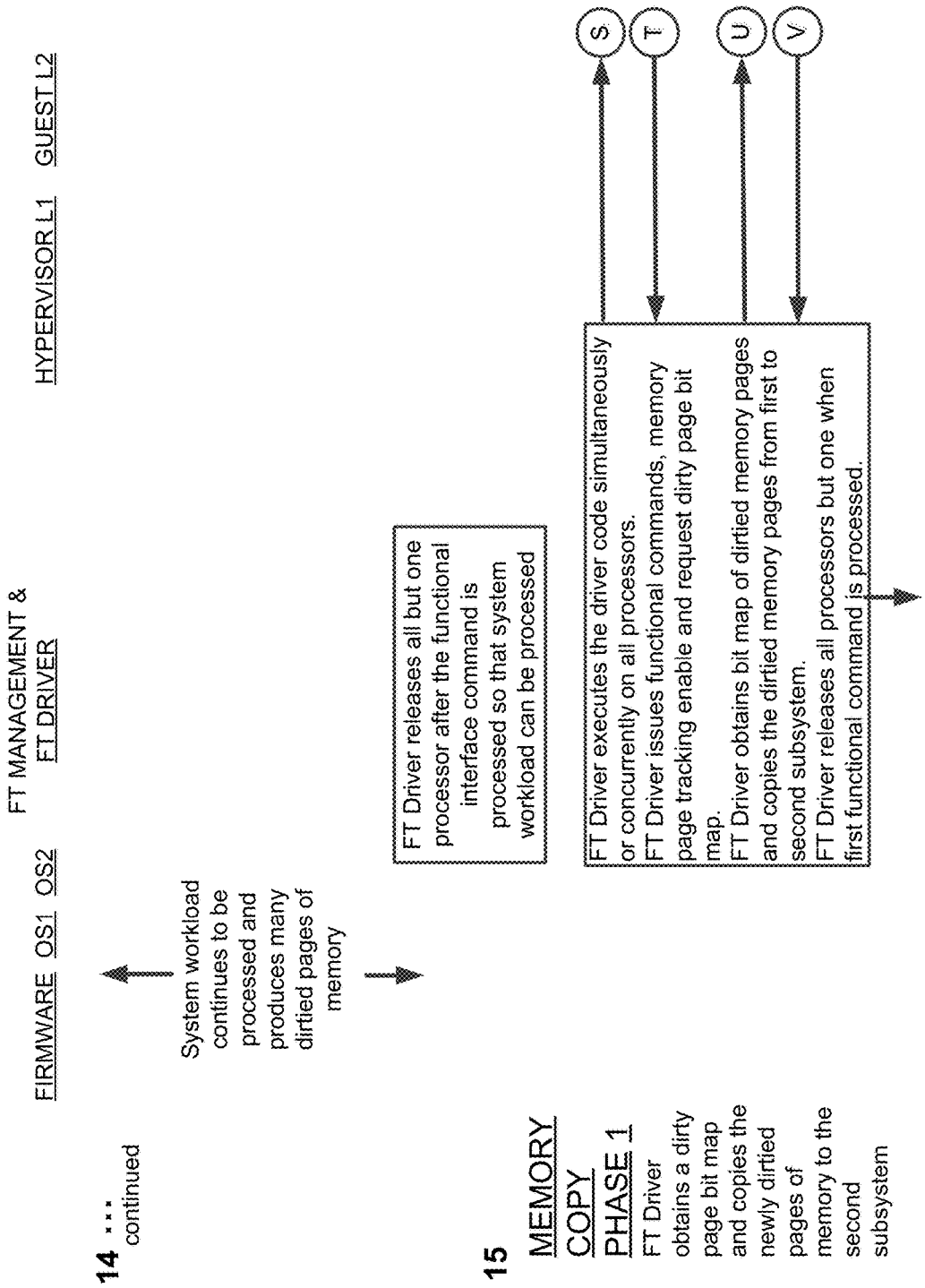

| FIRMWARE | OS1 | OS2 | FT MANAGEMENT & FT DRIVER | HYPERVISOR L1 | GUEST L2 |
|---|---|---|---|---|---|

19

FT Driver executes driver code on all processors simultaneously or concurrently and then causes the FTVMM to unload the FTVMM on all processors.

FT Driver determines that the firmware function to enter Mirrored Execution has completed FT Driver causes the FTVMM to unload the FTVMM

FIG. 3U

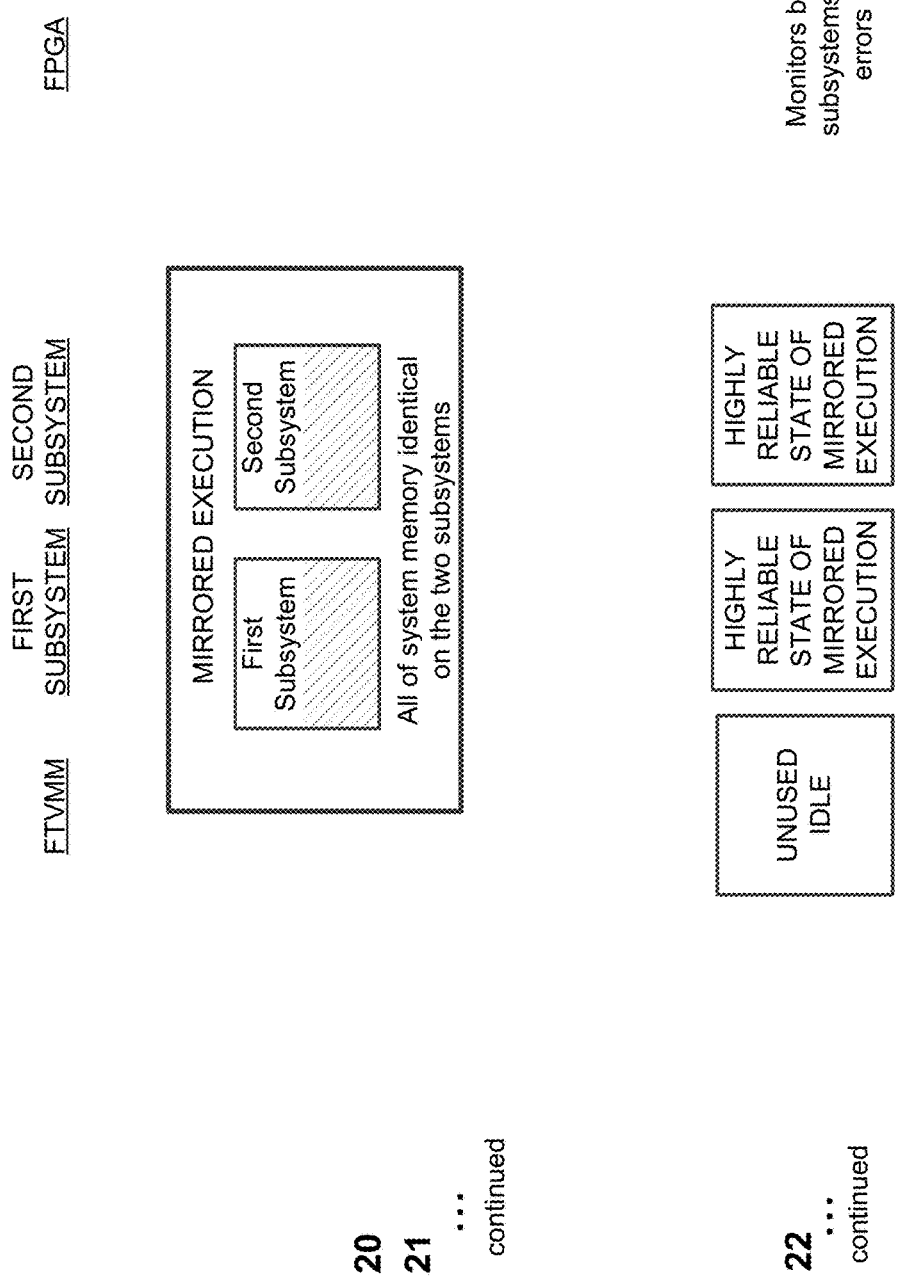

METHOD FOR DIRTY-PAGE TRACKING AND FULL MEMORY MIRRORING REDUNDANCY IN A FAULT-TOLERANT SERVER

FIELD OF THE INVENTION

The invention relates generally to the field of fault tolerant computing and more specifically to memory mirroring in a fault tolerant server.

BACKGROUND OF THE INVENTION

A fault tolerant server ("FT Server") is a computer system with redundant hardware and software that permits a currently active server subsystem to fail, and yet permit the continued processing of data on a duplicate or redundant server subsystem. Such an FT Server must maintain a duplicated or mirrored current image of the operating system state in the second non-active server subsystem, and that image must include all the processor, register, cache and memory state of the currently active server subsystem, so as to reduce the possibility of functional server failure when a hardware component fails. In such an FT Server, the first or currently active server subsystem memory must be copied and updated into a physically separate, mirrored physical memory system in the second or currently non-active server subsystem in order to continue operation using that second previously non-active server subsystem with no or minimal interruption when a hardware component failure occurs in first or active server subsystem. In such an FT Server, after the memory contents and processor state of the two server subsystems have been made identical, the two subsystems must continue to execute all their processing operations in a parallel and identical manner that generates identical memory contents on the two subsystems unless a hardware failure or a transient hardware error occurs. In this discussion, the phrases "FT Server" and the "Server" are used synonymously.

In more detail, such a redundant or mirrored physical FT Server (also referred to as a "Mirrored System") in one embodiment typically includes two physically separate but logically identical server subsystem modules which may be termed mirrored processor and memory units. In this configuration, the FT Server computer system consists of two physically separate processing units which contain identical memory data and identical processor and clocking states. When such an FT Server is first started or booted, or when a module is removed or replaced, the system will temporarily execute in a non-redundant mode with only one FT Server subsystem functioning. When the malfunctioning unit is brought back into service after a transient hardware error, or when the malfunctioning unit is replaced, the FT Server will transition again into the highly reliable fault tolerant state by using a hardware and software mechanism to copy the current processor and memory state of the functioning FT Server subsystem into the new or uninitialized module of the repaired FT Server subsystem. The FT Server then enters a state of mirrored execution in which the two modules receive identical IO device inputs from the external environment, and the two modules continue to generate identical processor, memory, and system hardware clock states on their own. The mirrored subsystems can be described as operating "in lockstep". While in the state of Mirrored Execution, the FT Server uses logic within a hardware Field Programmable Gate Array (FPGA) component to detect hardware errors or other state differences in either Mirrored Subsystem, and to isolate the failing subsystem so that the other subsystem can continue to operate normally. While in the state of Mirrored Execution, the FPGA causes all IO Direct Memory Access (DMA) writes into system memory to occur in parallel with the same timing on both subsystems, so that the two subsystems receive identical IO device inputs from the external environment.

To create the mirrored state, the entire current system memory contents must be copied into the new module. The system memory is constantly being written and modified by the currently running programs and workload, such as the Operating System or "OS" installed on the FT Server; the services and applications installed on the Server; the Operating System's commonly used Hypervisor, if installed to control virtual machines and any virtual machine (VM) guests; and the guest operating systems and programs of those virtual machine guests. These changes to active system memory are termed "dirty pages" and must be detected by a selective memory mirroring hardware and software mechanism so as to be able to create a fault-tolerant mirrored memory state by copying just the changes in memory (i.e., the changes in memory which occur during and after an initial phase which copies the entire system memory into the new memory module). By copying just the changes in memory (after the initial complete copy has completed), a copy of the entire active memory is maintained without introducing the excessive delays or temporary server outages that would accompany suspending the system workload in order to complete the copying of all of the memory of the active server subsystem.

The native operating system of the FT Server and its components may not provide a suitable memory-mirroring interface or API. This is especially true when a hypervisor such as Windows Hyper-V, VMWare ESX, or Linux KVM has been enabled in the FT Server. What is needed is a method for determining dirty pages for operating systems that do not provide a suitable memory-mirroring interface. The present invention addresses this need.

SUMMARY OF THE INVENTION

In one aspect, the invention relates to a method of transferring memory from one memory subsystem to another memory subsystem in an FT Server system. In one embodiment, the method includes the steps of: reserving a portion of memory using BIOS of the FT Server system; booting the FT Server, FT Server OS and starting a hypervisor if the system's administrator has enabled Hypervisor and Guest Virtual Machine (VM) operation; loading and initializing a kernel-mode FT Driver into memory; and subsequently loading and initializing a Micro Virtual Machine Manager (micro VMM) including a Second Level Address Translation Table (SLAT) (or as also referred to by various manufacturers: Intel—Extended Page Table [EPT]; AMD—Rapid Virtualization Indexing [RVI]) into the reserved portion of memory and causing all processors to execute their programs as guests of this Virtual Machine Manager (VMM), referred to herein as an FTVMM module. In another embodiment, the method includes tracking memory accesses by the OS and all software components except the Guest L2 by using the FTVMM's SLAT (termed SLAT L0) in Reserved Memory; and tracking memory accesses by the Guest L2 by using the Hypervisor's SLAT (termed SLAT L2) and by intercepting the Hypervisor's (termed Hypervisor L1's) s writes to the SLAT L2. The terms L0, L1 and L2 are used for clarity and may refer to the attached drawings, and do not necessarily conform to any nomenclature for virtualization states. In yet another embodiment, the method includes entering Brownout—level 0, by performing a full memory copy of all system memory into the second Subsystem while keeping track of memory pages that have been modified by currently executing software by initially clearing the dirty bits (D-Bits) (D-bit 9 of each page table entry) in all the enabled page table entries (such as PDPTE 1-GB pages, PDE 2-MB pages, and PTE 4-KB pages) of the currently active SLAT tables in the FT Server, and then monitoring and accumulating the D-Bits to track the newly dirtied pages of memory.

In still yet another embodiment, the method includes entering Brownout of levels 1-4 tracking all D-Bits by performing multiple iterations of: obtaining a dirty page Bit Map representing the D-Bits that were tracked as described in the preceding paragraph; repeating the steps of the previous paragraph to begin tracking new D-Bits that will occur during the current memory-copy operation; and copying the memory pages represented by the dirty page Bit Map into the corresponding memory locations of the second Subsystem. In one embodiment, the method includes entering Blackout by pausing all the processors of the FT Server in the FTVMM, except Processor #0, and disabling interrupts in the FT Driver for processor #0; copying the memory pages represented by the Bit Map of recently dirtied pages from active subsystem into the second Subsystem; and producing a final blackout memory range list containing the final set of dirty pages. In another embodiment, the method includes transferring the set of final pages to the mirror memory using a process which is controlled by an FPGA and FT Server Firmware, and completing the Blackout portion of the operation by completing and terminating the FTVMM. In still yet another embodiment, the method includes returning control to the FT Driver and resuming normal FT System operation.

In one embodiment, the FTVMM code remains in Reserved Memory following the resumption of normal FT System operation. In another embodiment, the reserved memory is the top ¼ GB to 2.25 GB (Gigabyte) of memory. In yet another embodiment, moving the data from the active memory uses an FPGA and a high speed hardware Direct Memory Access (DMA) engine. In still yet another embodiment, one of the operations which returns control to the FT Driver is by the FTVMM executing a VMLAUNCH instruction into the context of the FT Driver, and the FT Driver executing an instruction that causes a VMEXIT into the same program code of the FT Driver. It should be understood that the terms which describe Intel processor instructions and objects for hardware virtualization, such as VMCS, VMCALL, VMEXIT, VMLAUNCH, VMRESUME, VMCLEAR, VMXON, VMWRITE, VMREAD, VMPTRLD, and VMPTRST, are also intended to represent the functional similar or equivalent terms for processors manufactured by American Micro Devices and others, such as the terms VMCB, VMMCALL, #VMEXIT, VMRUN, VMLOAD, and VMSAVE.

BRIEF DESCRIPTION OF THE DRAWINGS

The structure and function of the invention can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

DESCRIPTION OF A PREFERRED EMBODIMENT

Figure 1:
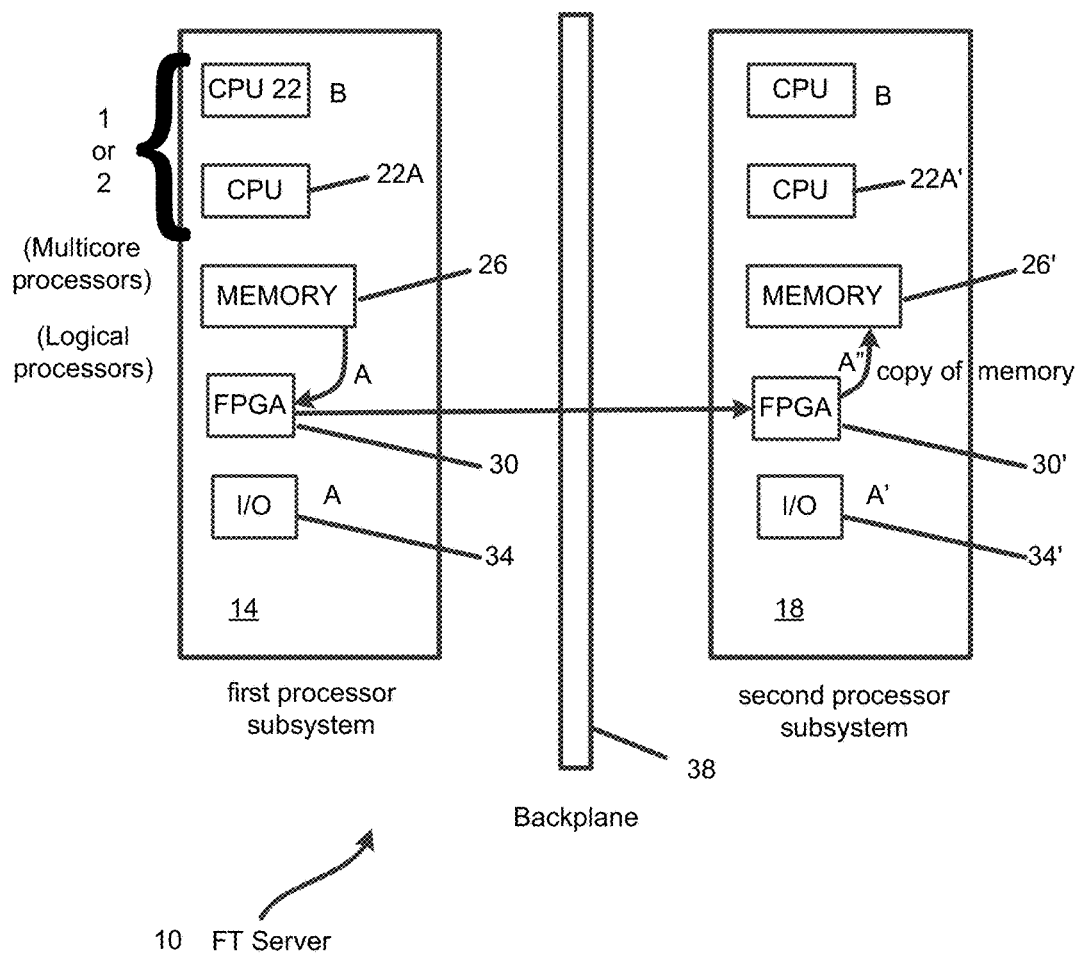
FIG. 1 is a diagram of an embodiment of a system utilizing the invention.

In brief overview and referring to FIG. 1, a block diagram of an embodiment of an FT Server 10 is depicted. In this embodiment, the FT Server includes two identical physical processor or server subsystems 14 and 18. Both processor subsystems are able to operate at the same time with identical processes working on the same data. One processor subsystem 14 is, for convenience, termed the currently active or first processor subsystem and provides output data to the user. Although both subsystems are processing the same data at the same time, the other processor subsystem 18 that is processing data is termed, also for convenience, the second or not-currently active or mirror subsystem. It should be remembered that both systems are equivalent and executing the same programs at the same time, when they are operating in the state of highly reliable mirrored execution.

Each processor subsystem includes a CPU 22, 22', a memory 26, 26', a Field Programmable Gate Array (FPGA) 30, 30', and an input/output (I/O) module 34, 34'. In one embodiment, the two physical processor subsystems 14 and 18 reside on the same backplane 38 and communicate with each other using the backplane 38. The FPGAs 30, 30' coordinate the transfer of data (arrows A, A' and A") from the currently active memory 26 to the mirror memory 26' so that the FT driver can create identical memory contents in both (currently active and mirrored) subsystems 14, 18. The I/O modules 34, 34' permit the two subsystems 14 and 18 to communicate with the outside world such as disk storage 42 and the network through a network interface (NI) 46.

Although this discussion is in terms of an embodiment with two processor subsystems, more than two processor subsystems can be used in an FT Server system. In the case of multiple processor subsystems, for example a three-processor (e.g. A, B, C) subsystem FT Server, the mirroring of the three processor subsystems is performed in two steps. First processor subsystems A and B are mirrored, and then the resulting mirrored A, B processor subsystems are mirrored to the C processor subsystem, and so on.

As stated above, the native operating system of the server may not provide a suitable interface for copying dirty pages from active memory 26 to mirror memory 26', especially when a virtual machine (VM) system is used. For example, some physical processors such as the Intel Haswell and Broadwell processors (Intel Corporation, Santa Clara, Calif. USA) provide a set of hardware virtualization capabilities including the VMX Root operations that permit multiple virtual operating systems to share the same physical processor simultaneously with full control of many aspects of system execution. The virtual machines each have their own operating system under the control of a host hypervisor. Such systems may not provide an interface to detect and copy dirty pages for memory used by those virtual machines.

Figure 2A:
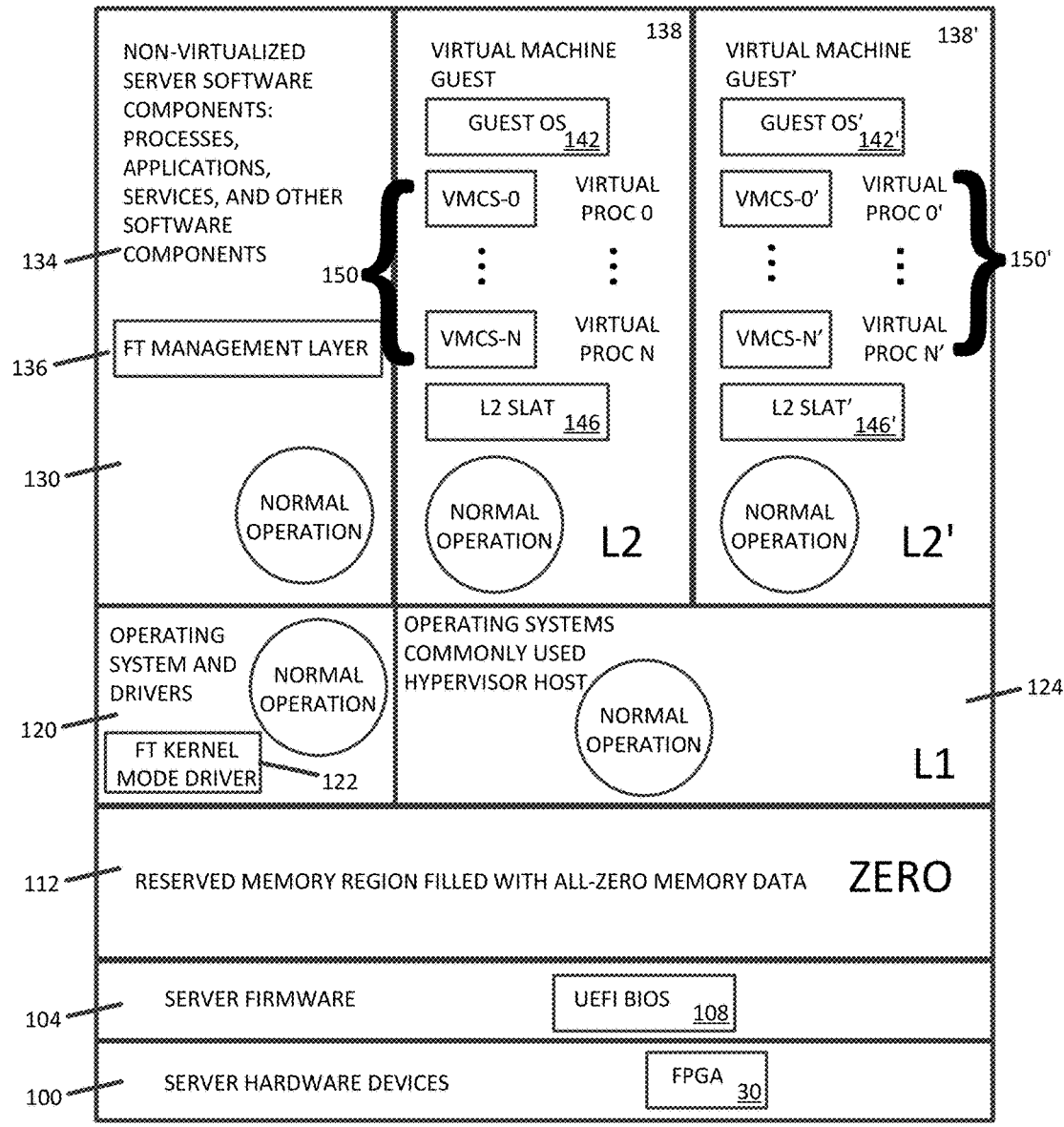
FIGS. 2A-2C are diagrams of an embodiment of the operating software and execution states of the OS, Hypervisor, Guest VM, FT Virtual Machine Manager (FTVMM), and other layers in an FT Server during the various stages of mirroring.
Figure 2B:
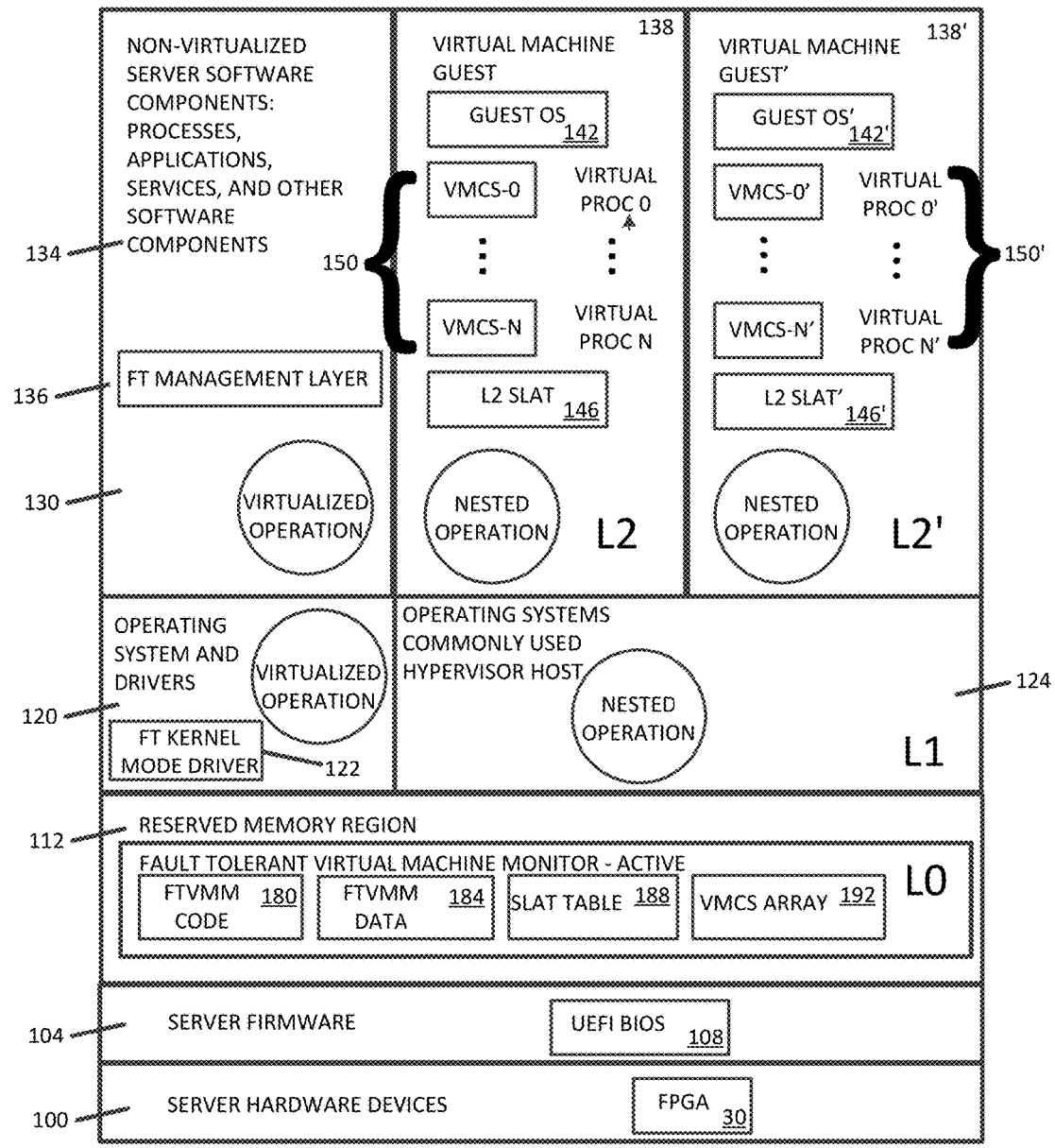
Figure 2C:
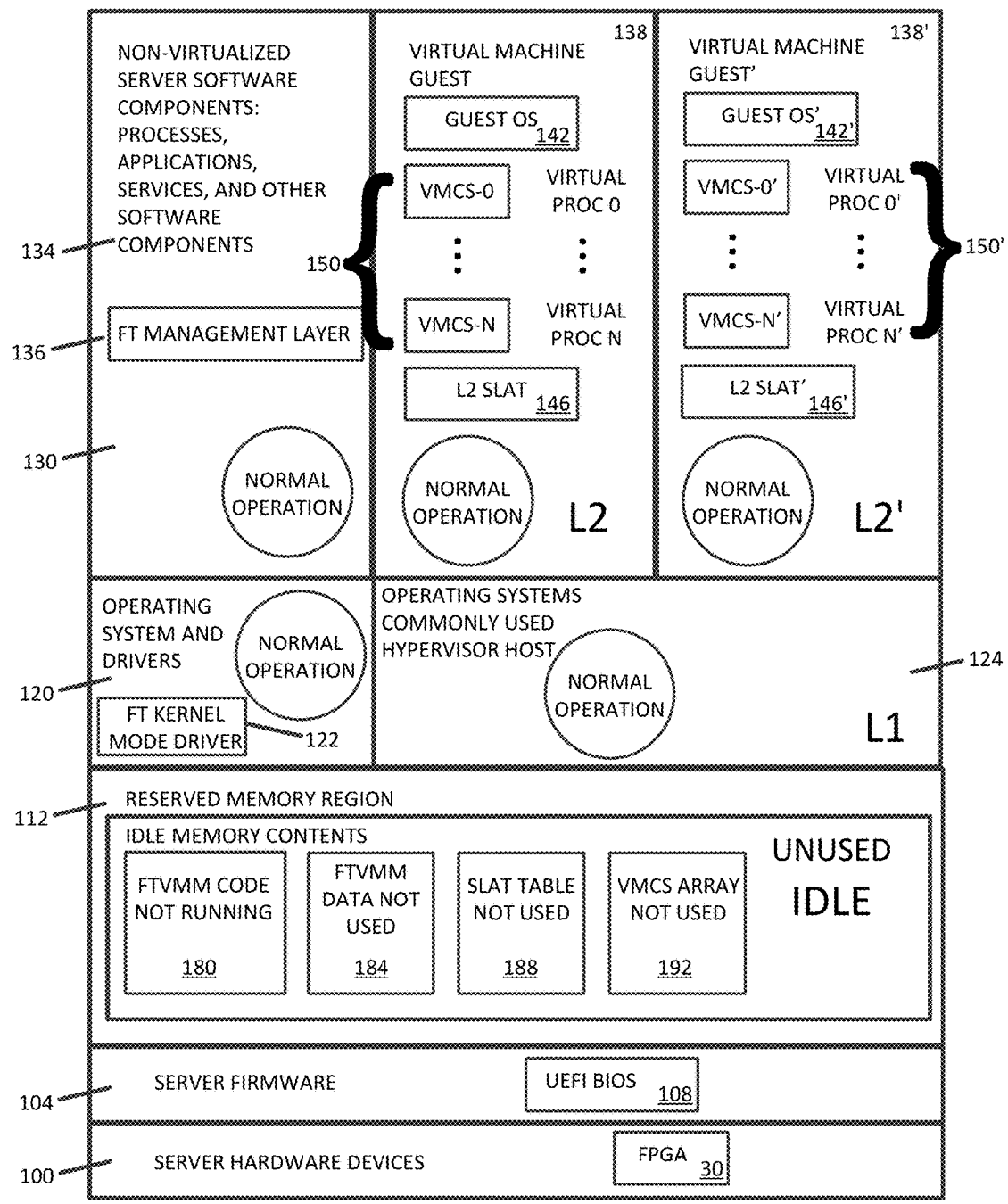

In more detail, FIGS. 2A-2C depict, as a layered software diagram, the state of the FT Server when undergoing various operations. Referring to FIG. 2A, in normal, non-mirrored, operation, the layers in the FT Server system include a hardware layer 100 including the FPGA 30; a server firmware layer 104 including the system Universal Extensible Firmware Interface (UEFI) BIOS 108; and a zero layer reserved memory region 112 that is initialized to zero.

The zero layer reserved memory 112 is reserved by the BIOS 108 at boot time. Although most of the memory of the FT Server system is available for use by the Operating System and software, the reserve memory 112 is not. The size of the reserved memory region 112 provides sufficient space for the FTVMM and a SLAT table configured with a 4-KB (4-kilobyte) page granularity and with a one-to-one mapping of all system memory. In one embodiment, a four-level SLAT Table provides a memory map with dirty bit and accessed bit settings that will identify all memory pages that are modified by the operating system kernel and other software. The four-level SLAT is sufficient to provide sufficient granularity to address each word of memory with a 4-Kbyte granularity, but other page sizes and mappings are possible.

The next layer (L1) 120 includes the operating system and drivers for the FT Server subsystem, including the FT Kernel Mode Drivers 122 and the commonly used hypervisor host 124.

The last layer (L2) 130 includes the non-virtualized server software components which are not controlled by a VMCS virtualization structure when in normal operation, such as processes, applications, and others 134, and it includes any Virtual Machine Guest (VM) 138, 138'. Non-virtualized software components 134 include an FT Management Layer 136. Each Virtual Machine Guest (VM) includes a VM Guest Operating System (VM OS) 142, 142', and a SLAT table associated with the VM (SLAT L2) 146, 146'. Also included in each VM 138, 138' is one or more Virtual Machine Control Structures associated with the VM (VMCS-N), generally 150, 150', one for each of the virtual processors 0-N that are allocated to that VM. In the diagram shown, the virtual processor VMCSs are labeled VMCS 0 to VMCS-N. Each VMCS contains a control field to enable a SLAT Table pointer (such as an Intel Extended Page Table Pointer EPTP) which can provide a mapping that translates Guest Physical Addresses to system Physical Addresses.

Referring now to FIG. 2B, at the start of mirroring, the FT Server is operating in non-mirrored mode. The FT Management Layer 136 causes the FT Kernel Mode Driver (FT Driver) 122 to begin processing a command to enter Mirrored Execution. The FT Kernel Mode Driver 122 loads or writes the program and data code of the FT Virtual Machine Monitor (FTVMM) code 180, the FTVMM data 184, the SLAT L0 188, and the VMCS-L0 Array 192 into the Reserved Memory Region.

The FT driver initializes the VMCS L0 for each processor and causes the FTVMM to be installed and to execute as a hypervisor whose program code is directly executed by every VMEXIT event (i.e. the processor mechanism that transfers execution from the Guest L2 into the hypervisor that controls the guest) that occurs in the FT Server. The FTVMM processes every VMEXIT and emulates the normal handling of the event that caused the VMEXIT in a manner such that the OS1, OS2, OS Commonly Used Hypervisor L1, and Guest L2 will continue their processing in a functionally normal manner as if the FTVMM were not installed and active.

At this point, the transfer of memory contents takes place under the following two conditions, termed "brownout" and "blackout". Mirroring, brownout and blackout may take place within a few minutes after the initial FT Server boot, once steady state operation is reached, or whenever a processor subsystem is brought back into service after a hardware error on a running FT Server. During a brownout phase, the normal system workload is processed and the processor continues to make computations and to access and modify active memory. Dirty pages caused by memory writes during brownout (while copying memory to the second Subsystem) are tracked and are copied in the next brownout or blackout phase. The FTVMM provides a Dirty Page Bit Map to identify the modified memory pages in each phase. In Brownout phase 0, all memory is copied while tracking newly dirtied pages. In Brownout phases 1 and later, only the dirtied pages during the previous phase are copied. In Blackout, all processors but one are paused, and interrupts are disabled. No system workload is processed during Blackout. The dirtied pages from the previous (brownout) phase are copied, and a final Modified Page Range List is created. The remaining dirty pages and the active processor state are then copied to the mirror memory. Once this is complete, the FT Driver generates a System Management Interrupt, and all processors execute in Firmware UEFI BIOS and Firmware SMM Module which use the FPGA to generate a warm reset and enter the state of Mirrored Execution. The Firmware SMM performs a Resume to the FT Driver, and FT Driver completes the Blackout phase, unloads the FTVMM, releases the processors that were paused, enables interrupts, and completes its handling of the request for Mirrored Execution.

Referring now to FIG. 2C, with the mirroring process completed, the FTVMM code 180 in the reserved memory 112 is unloaded and no longer executing. The FT Server still is operating in mirrored execution mode. The FTVMM data 184, the SLAT 188, and the VMCS 192 are not used, and the reserved memory is idle, waiting for the next error condition.

Figure 3A:
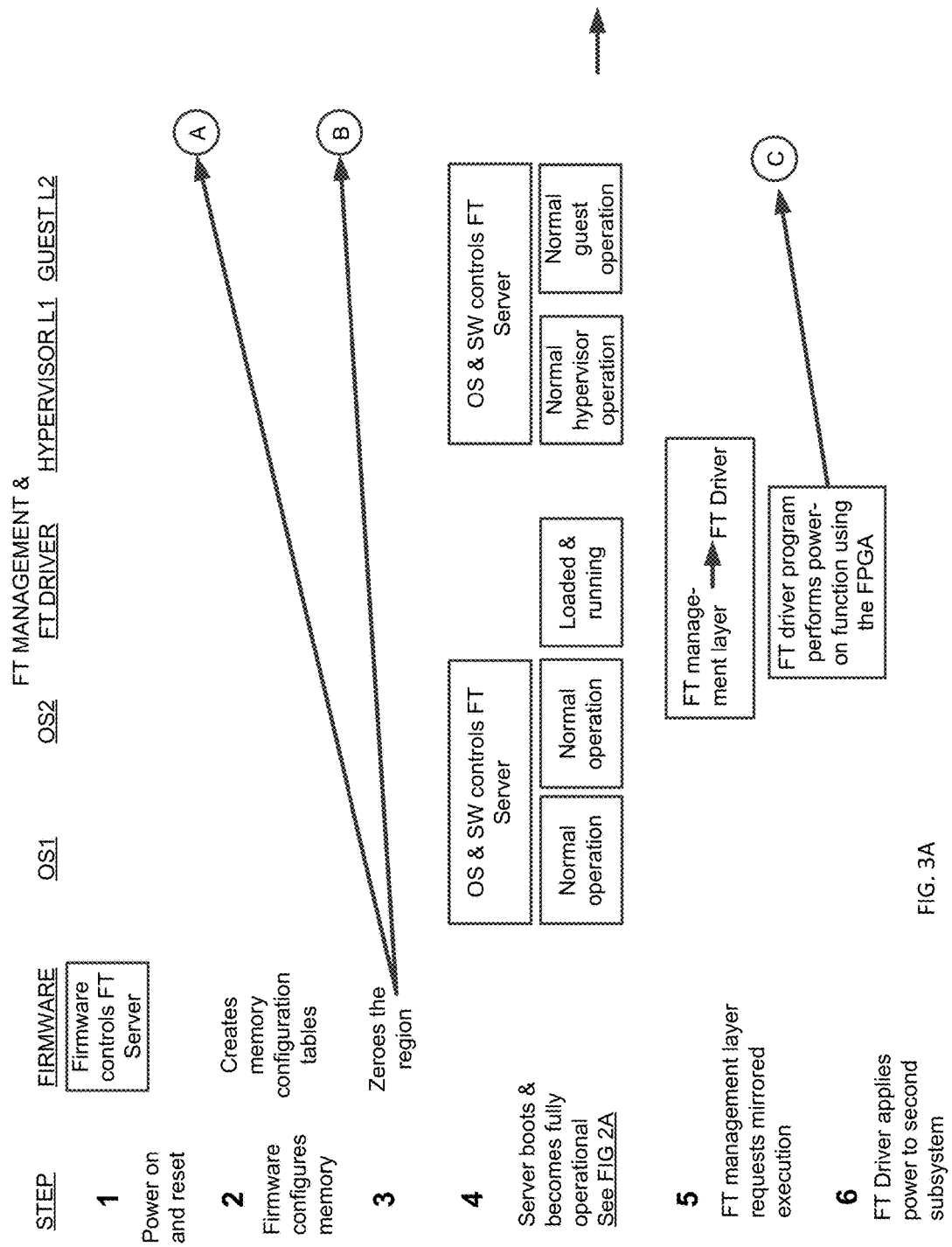
FIGS. 3A-3X are a series of schematic diagrams showing exemplary steps of an embodiment of a process constructed according to the invention.
Figure 3B:
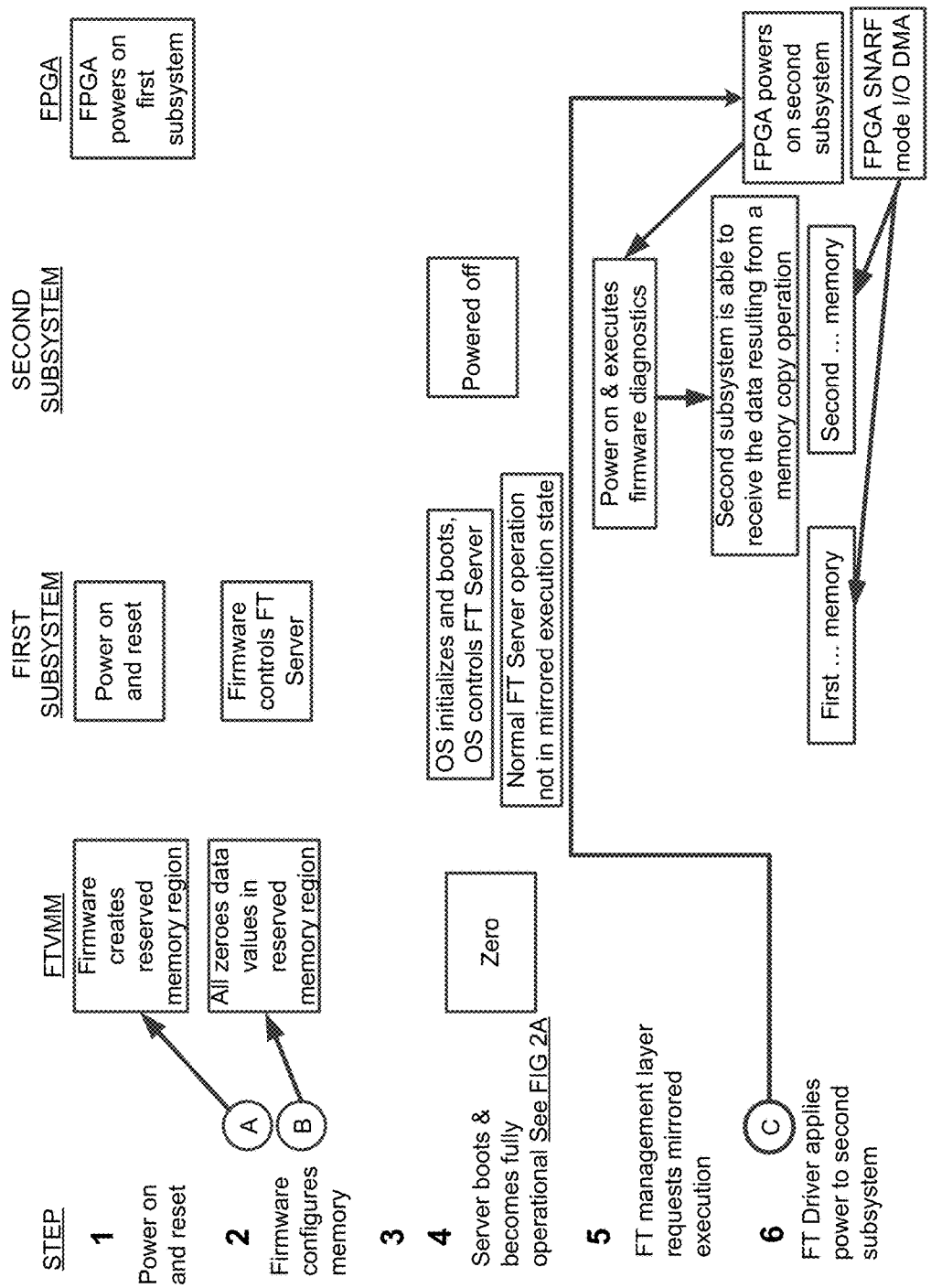
Figure 3C:
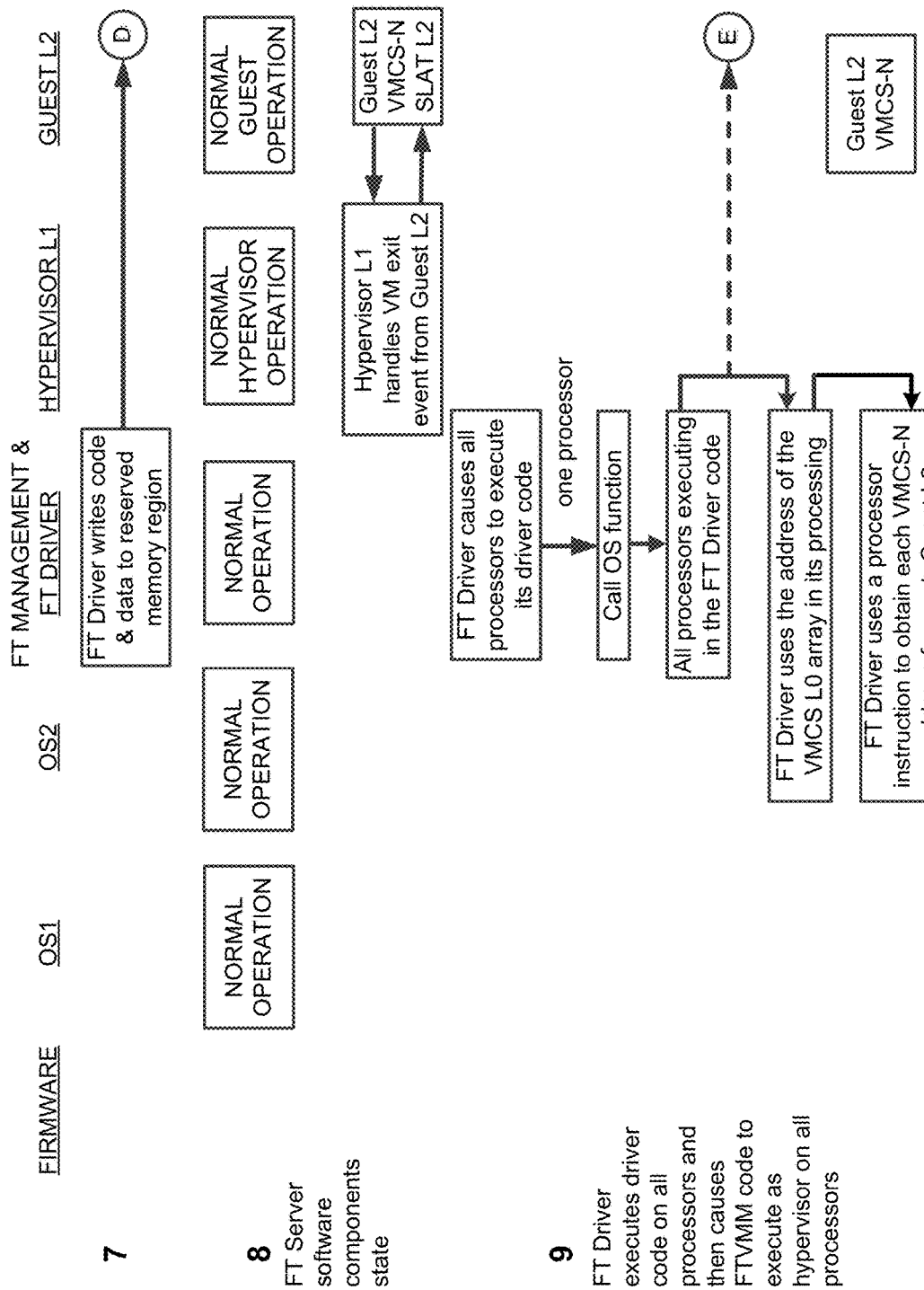
Figure 3D:
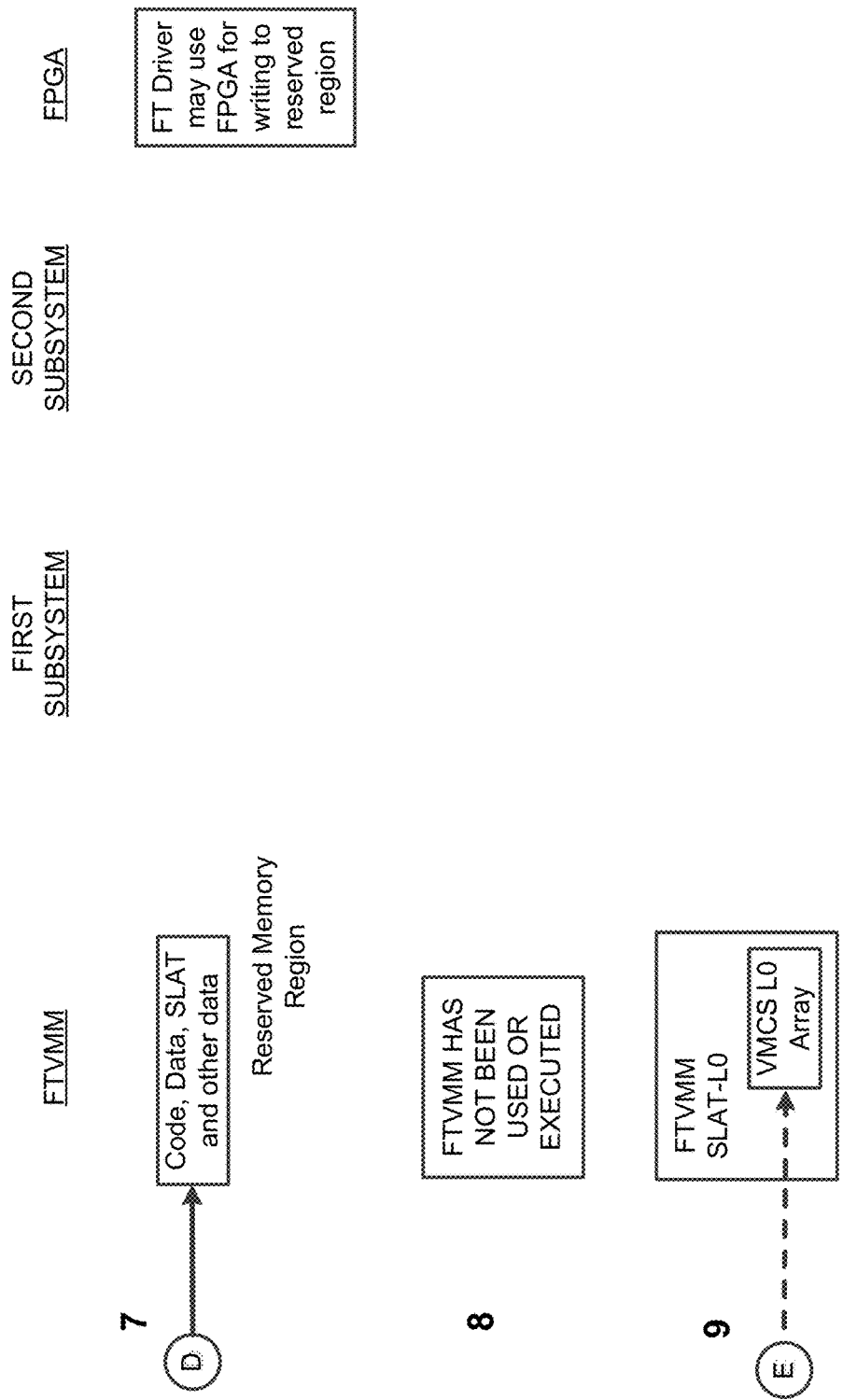
Figure 3E:
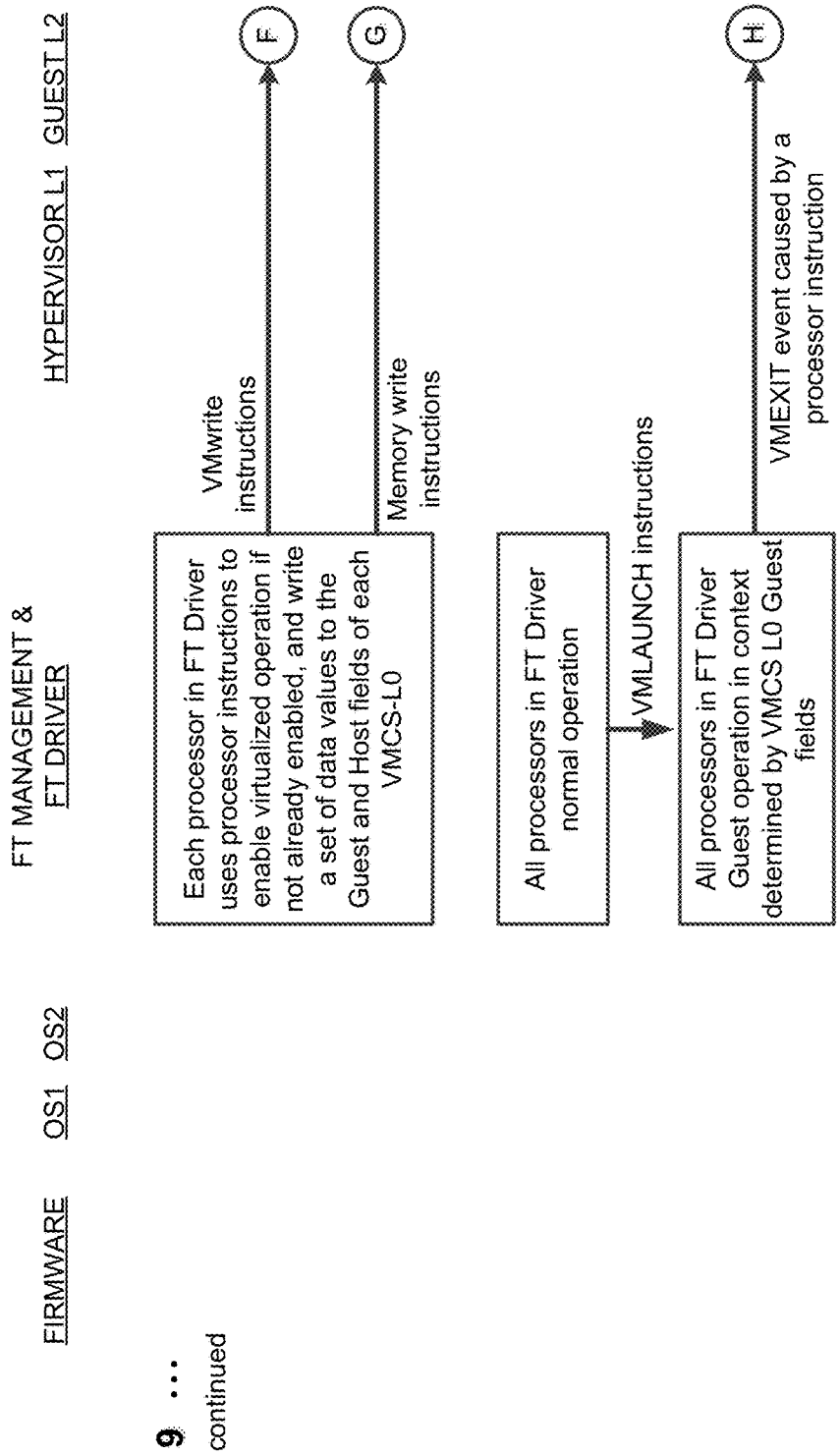
Figure 3F:
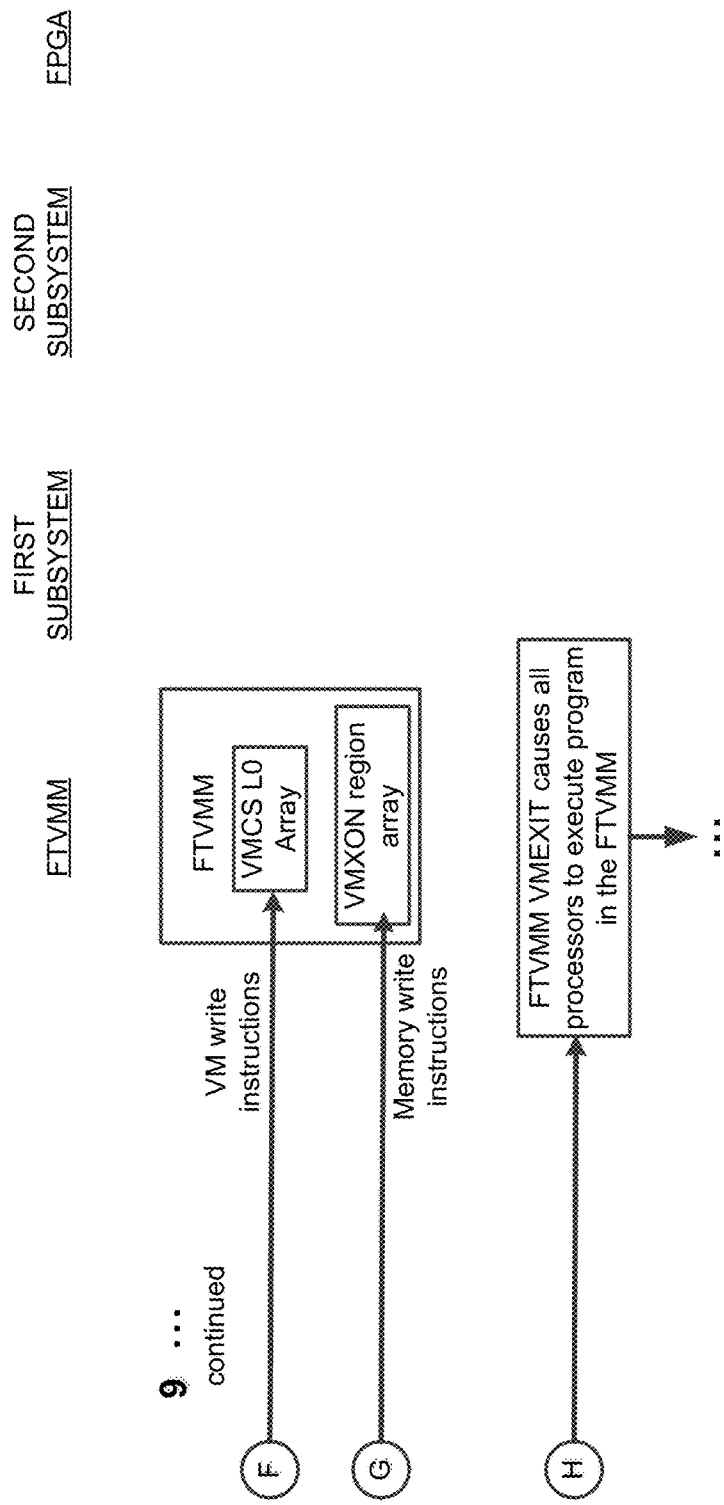
Figure 3G:
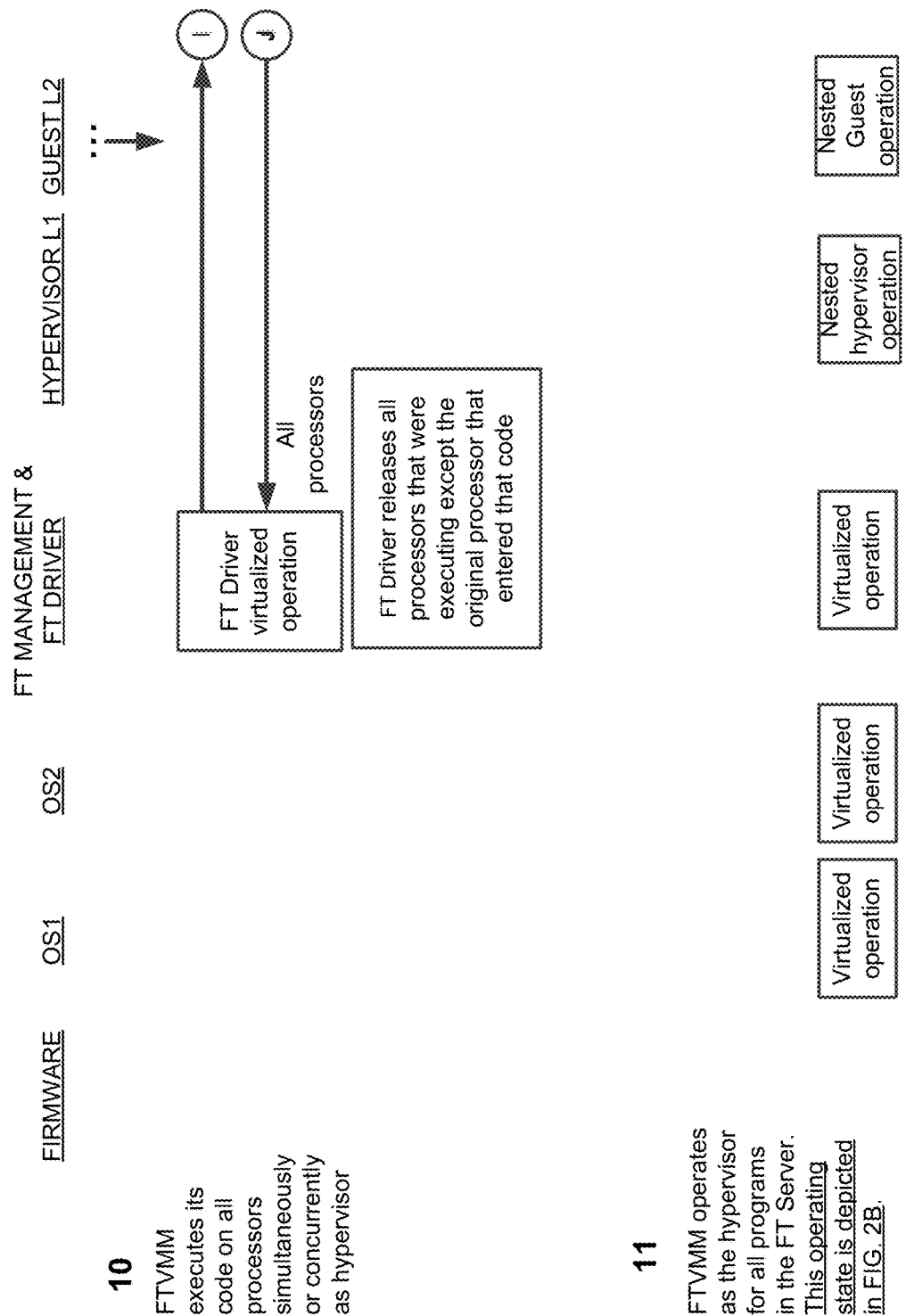
Figure 3H:
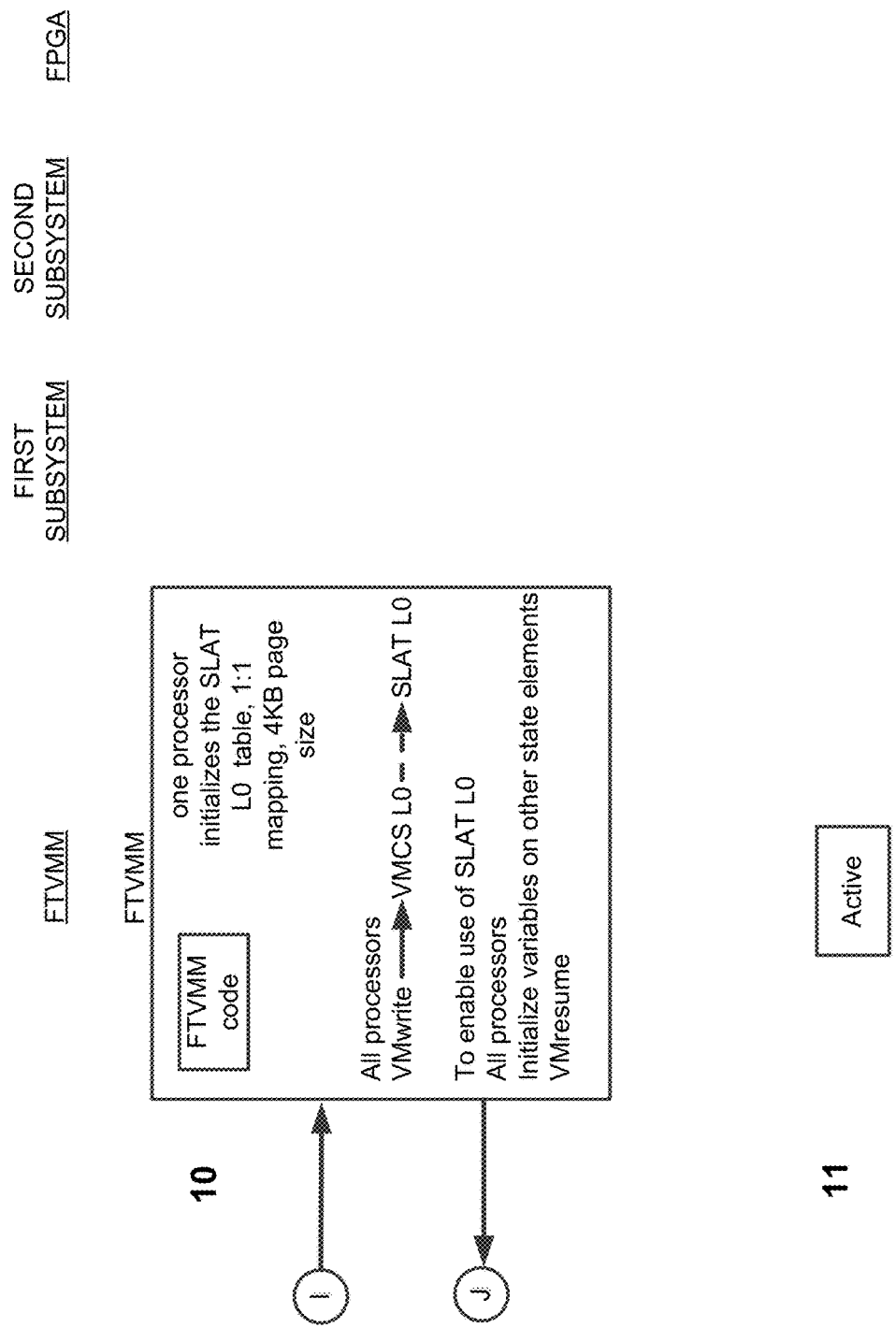

In more detail, an exemplary system representation showing steps for mirroring memory is shown in FIGS. 3A-3X. Various steps and related features are shown in FIGS. 3A-3X. Various steps including combinations and subsets of the steps can be used in various embodiments. A discussion of steps 1-22 follows, starting at FIG. 3A and continuing through and including FIG. 3X, steps 1-22 and associated details are as follows:

Step 1—FT Server Power on and Reset

The FT Server System is Powered-On and performs a Hardware Reset.

Step 2—FT Server Firmware Configures Memory

The FT Server UEFI and BIOS Firmware detects all of system memory, and creates a set of memory configuration tables to define which areas of memory may be used by the Operating System.

Step 3—FT Server Firmware Creates a Reserved Memory Region

The UEFI BIOS reserves a region at the top of system memory for use by FTVMM. This memory region is defined in the memory configuration tables as a type of reserved system memory which is not available for use by the Operating System. This region of reserved memory is referred to herein as the "Reserved Memory Region". The UEFI BIOS writes a data pattern consisting of all zeroes to the Reserved Memory Region. The size of the reserved memory region includes sufficient space to contain a fully-populated four-level SLAT table, such as a fully-populated four-level SLAT table for Intel processors, configured so as to map all of the FT Server's physical memory with a 4-Kbyte page size granularity. This requires more than $\frac{1}{512}^{th}$ of all system memory. For an FT Server with physical memory the size of 1-Terabyte, the Reserved Memory Region may occupy 2.25-Gigabytes. This memory may be located at the top of memory (up to and including the system's maximum populated physical memory address). In one embodiment, the UEFI firmware uses the relationship ((SystemMemorySize/512)+256 MB) to determine the size of the Reserved Memory Region.

Step 4—FT Server Boots and Becomes Fully Operational:

The FT Server operating system completes its boot and startup sequence, and enters a fully operational state in which a workload that is configured for the server may be processed. The state of FT Server operation is depicted in FIG. 2A as discussed above. The FT Kernel Mode Driver (FT Driver) and the FT Management Layer having been loaded are present and are running. If the FT Server is configured with one or more Guest Virtual Machines, then the Operating System's Commonly Used Hypervisor may be present, and Virtual Machine Guests may be executing their own Operating System and a workload which has been configured for the Guests.

Step 5—FT Management Layer Requests Mirrored Execution

The FT Management Layer detects that the second Server Subsystem is present in the FT Server. The FT Management Layer performs a function call or command to the FT Driver to request the FT Driver to bring the second Server Subsystem into operation and to transition the FT Server into the state of highly reliable Mirrored Execution.

Step 6—FT Driver Applies Power to the Second Subsystem

The FT Driver uses the FT Server FPGA to perform a Power-On and Hardware Reset to the Second Subsystem. The Second Subsystem completes a diagnostic program in its FT Server Firmware (UEFI and BIOS), which initializes the processor and memory components in the Second Subsystem. The Second Subsystem enters an operating state in which the FT Server FPGA and other hardware components are able to perform a memory copy from the first Server Subsystem into the second Server Subsystem if the FT Driver requests and programs a Memory Copy operation.

The FT Driver uses the FT Server FPGA to enter an operating state (termed Snarf Mode) in which all Direct Memory Access (DMA) memory writes caused by external hardware devices (I/O Devices) will perform identical memory writes to the first Server Subsystem and the Second Subsystem in parallel. In this way, IO operations will not cause memory differences between the two Subsystems. The FPGA Snarf Mode will be disabled or terminated by the Firmware SMM Module after the FT Server transitions into the state of Mirrored Execution.

Step 7—FT Driver Writes Code and Data to the Reserved Memory Region

The FT Driver writes the FTVMM Code, Data, and SLAT Table memory contents, and other data, into the Reserved Memory Region. The SLAT in the Reserved Memory Region may be termed the SLAT L0. In one embodiment, the FT Driver uses a memory mapping function of the Operating System, and it may also use a hardware resource such as a Direct Memory Access (DMA) controller or the FT Server FPGA, to perform the operation of writing data into the Reserved Memory Region.

Step 8—Description of the State of the FT Server Software Components Prior to Executing the FTvmm Code At this stage, the FT Server software components are running in Normal Operation. The OS1 and OS2 software and program components may not be executing in a virtualized state. The Operating System's Commonly Used Hypervisor (Hypervisor L1), if present, continues to process each VMEXIT from the Guest Virtual Machines that it controls (Guest L2, L2') if guests are present.

There may be none or many (hundreds) of Guest Virtual Machines whose VMEXIT events are handled by the Hypervisor L1. Further, there may be more than one logical instance of the Hypervisor L1. At this stage of operation, before the FTVMM code has been executed by any processor, the system is in the state depicted in FIG. 2A, except that the Reserved Memory Region has been written or initialized by the FT Driver with the desired Code, Data, and SLAT Table memory contents.

Referring also to FIG. 2A, the OS1 and OS2 are in Normal Operation. The Hypervisor L1 is in a Normal Hypervisor Operation state. Guest L2 is in a Normal Guest Operation state. The terms Normal Hypervisor Operation and Normal Guest Operation can be understood as implying, in part, that the program code of the Hypervisor L1 is invoked or executed directly by the processor's VMEXIT behavior when an operation in the Guest L2 causes a VMEXIT to occur.

Step 9—FT Driver Executes Driver Code on all Processors Simultaneously or Concurrently and then Causes the FTVMM Code to Execute as Hypervisor on all Processors The FT Kernel Mode Driver synchronizes all the processors in the system within a program which causes each processor to enable virtualization (such as Intel VMX root mode), virtualize its current execution state using the processor's VMCS L0, and then perform a VMEXIT into the FTVMM context, so as to:

a. perform a VM Pointer Store (VMPTRST) processor instruction to read the VMCS pointer that holds the address of the corresponding VMCS (VMCS-N) of the current GUEST L2 and write the resulting value to a software structure that is used by the FTVMM;

b. write a set of values extracted from the processor's currently executing register set into the corresponding Guest Fields of the FTVMM VMCS for each processor, termed VMCS L0, in the FTVMM VMCS Array, by using instructions such as VMCLEAR (clear the VMCS), VMPTRLD (make a VMCS current and active), and VMWRITE (modify a VMCS field);

c. write a set of values that are determined by the designed operating requirements of the FTVMM, including protected mode memory configurations and processor HOST Register Instruction Pointer (RIP) entry points of the FTVMM, stack pointers, page tables that may map all of system memory, and other conditions of the FTVMM execution context, into the corresponding Host Fields of each processor's VMCS L0 in the FTVMM VMCS Array;

d. perform the VMLAUNCH (launch a cleared VMCS) processor instructions to cause the processor to begin executing as a guest;

e. thereby begin executing in the processor's current context in the FT Driver program code as a Guest, in a processing context that is determined by the Guest Fields of the VMCS L0;

f. then, each processor executes a processor instruction within the FT Driver code which causes a VMEXIT and a transfer of execution into the FTVMM hypervisor program code which is located in the Reserved Memory Region, in a processing context that is determined by the Host Fields of the VMCS L0.

Step 10—FTVMM Executes its Code on all Processors Simultaneously or Concurrently as a Hypervisor The FTVMM program code, FTVMM CODE, waits for all processors in the FT Server to perform a VMEXIT into the FTVMM context which consists of code and data located in the Reserved Memory Region. One processor calls a function within FTVMM to initialize the SLAT table, termed SLAT L0, in the Reserved Memory Region with a one-to-one Guest Physical to Physical address mapping, using a Page Table Entry size of 4-Kbytes. The FTVMM performs a set of processor instructions such as VMWRITE to each processor's VMCS L0, so that the processor will subsequently use the SLAT L0 table for address translation, at times when the processor is executing as a guest using the VMCS L0 (in the execution context determined by the Guest Fields of the VMCS L0). The functionality of the SLAT L0 will be used subsequently for detecting "Dirty Bits" in its lowest-level Page Table Entries, in order to determine which memory pages have been modified by software on the FT Server. The FTVMM initializes variables and extracts guest and processor state information from registers and software structures. When this has been completed on all processors, the FTVMM performs a VMRESUME instruction to return to the FT Kernel Mode Driver.

Figure 31:
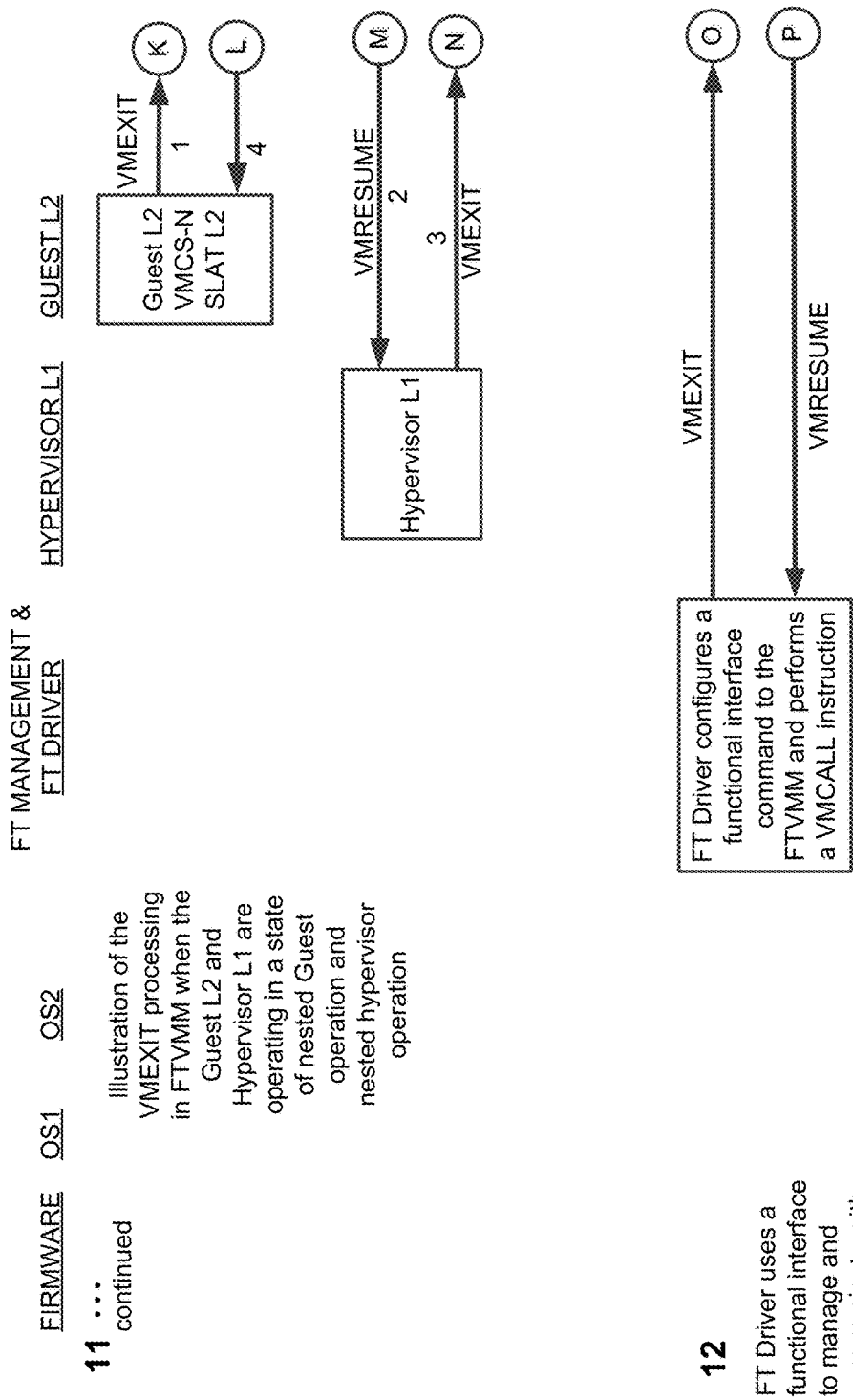
Figure 3K:
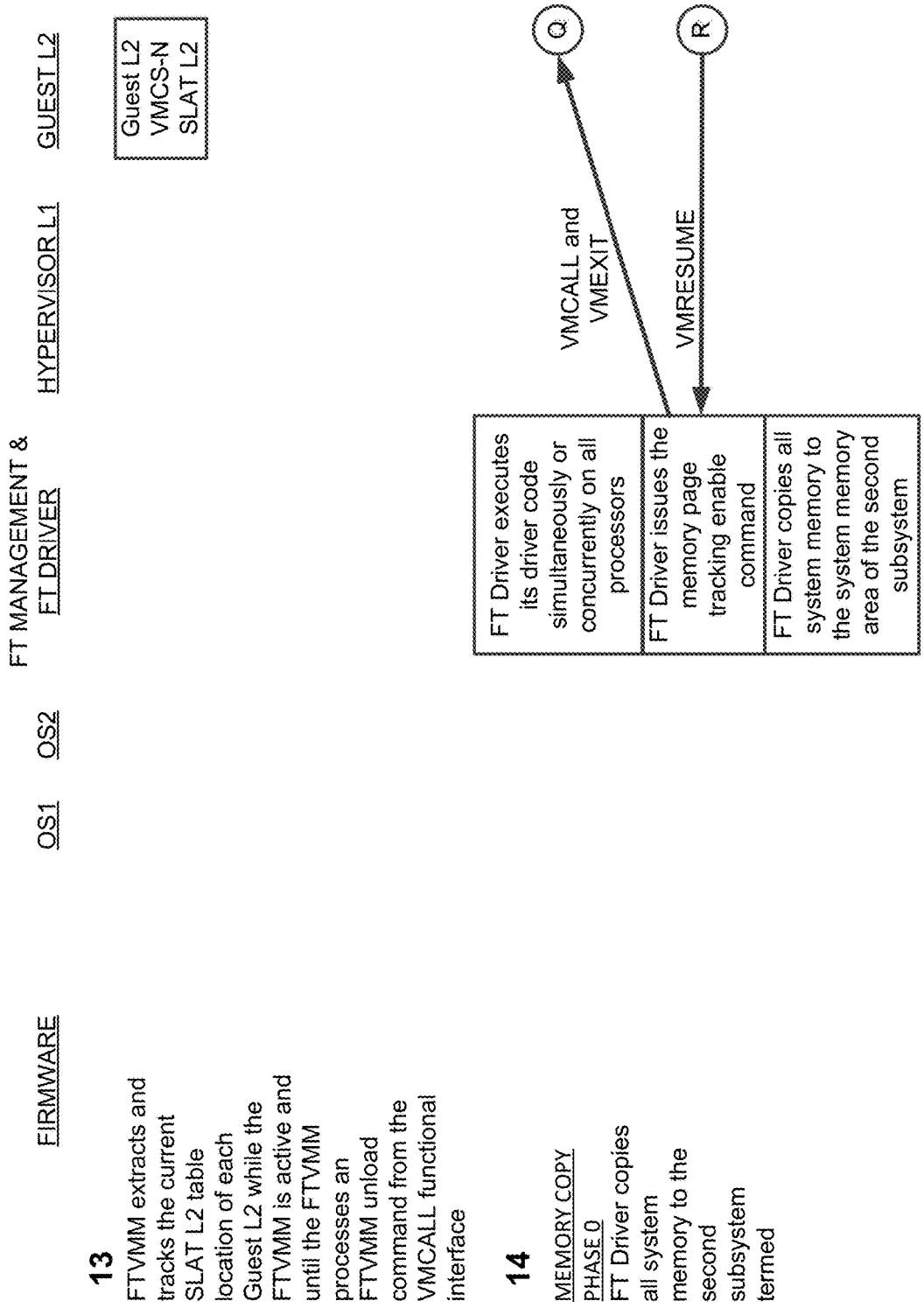
Figure 3L:
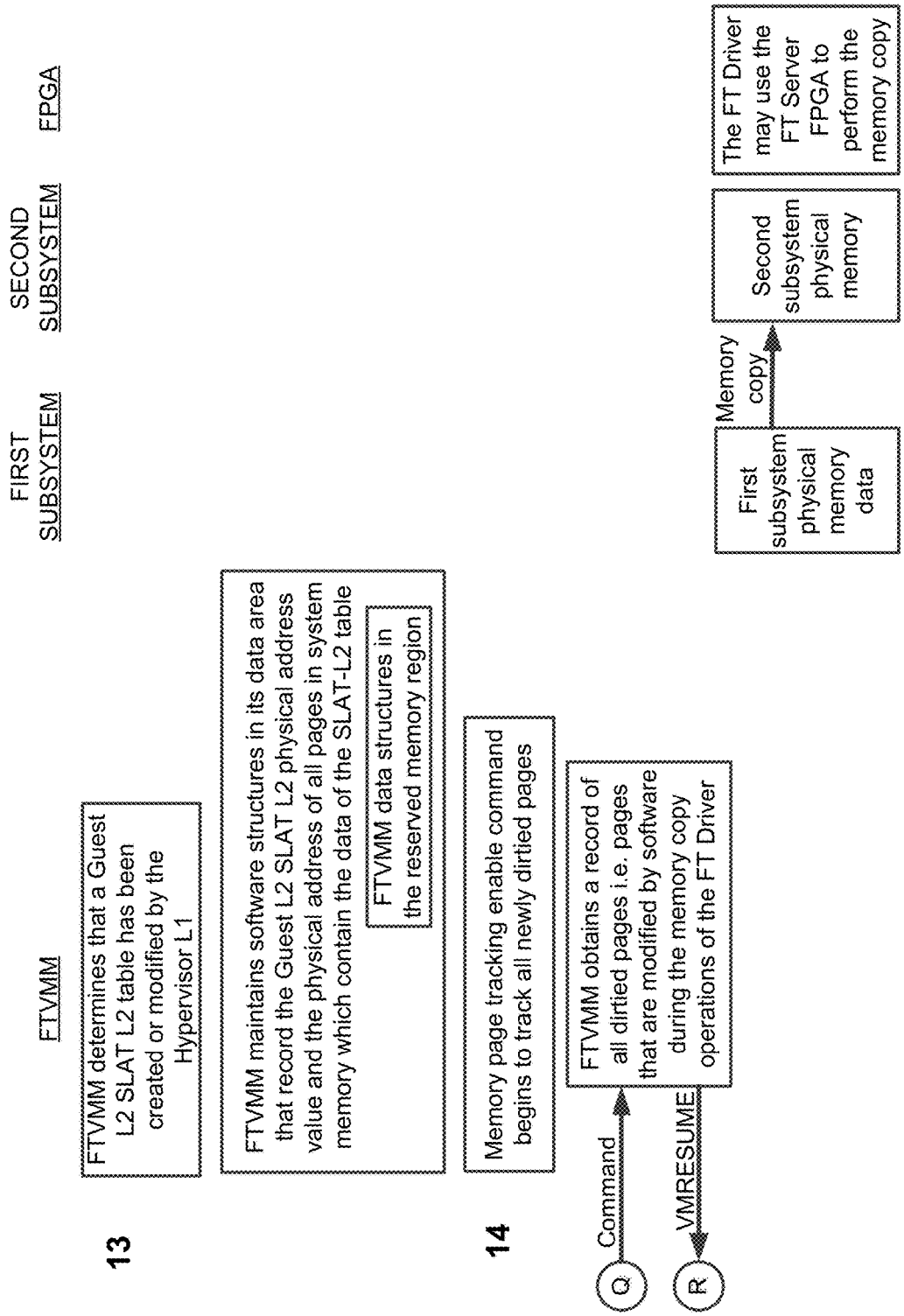
Figure 3N:
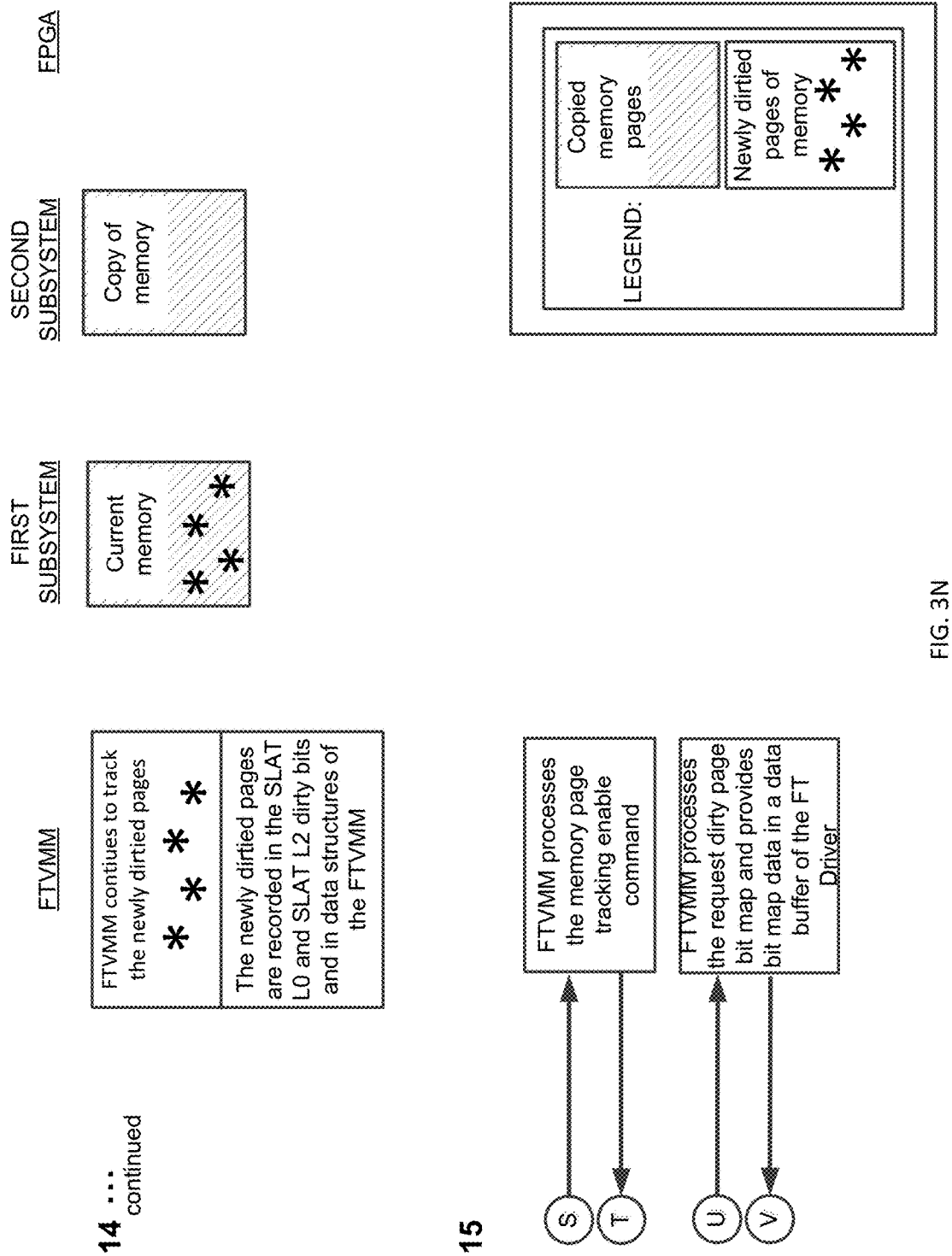
Figure 30:
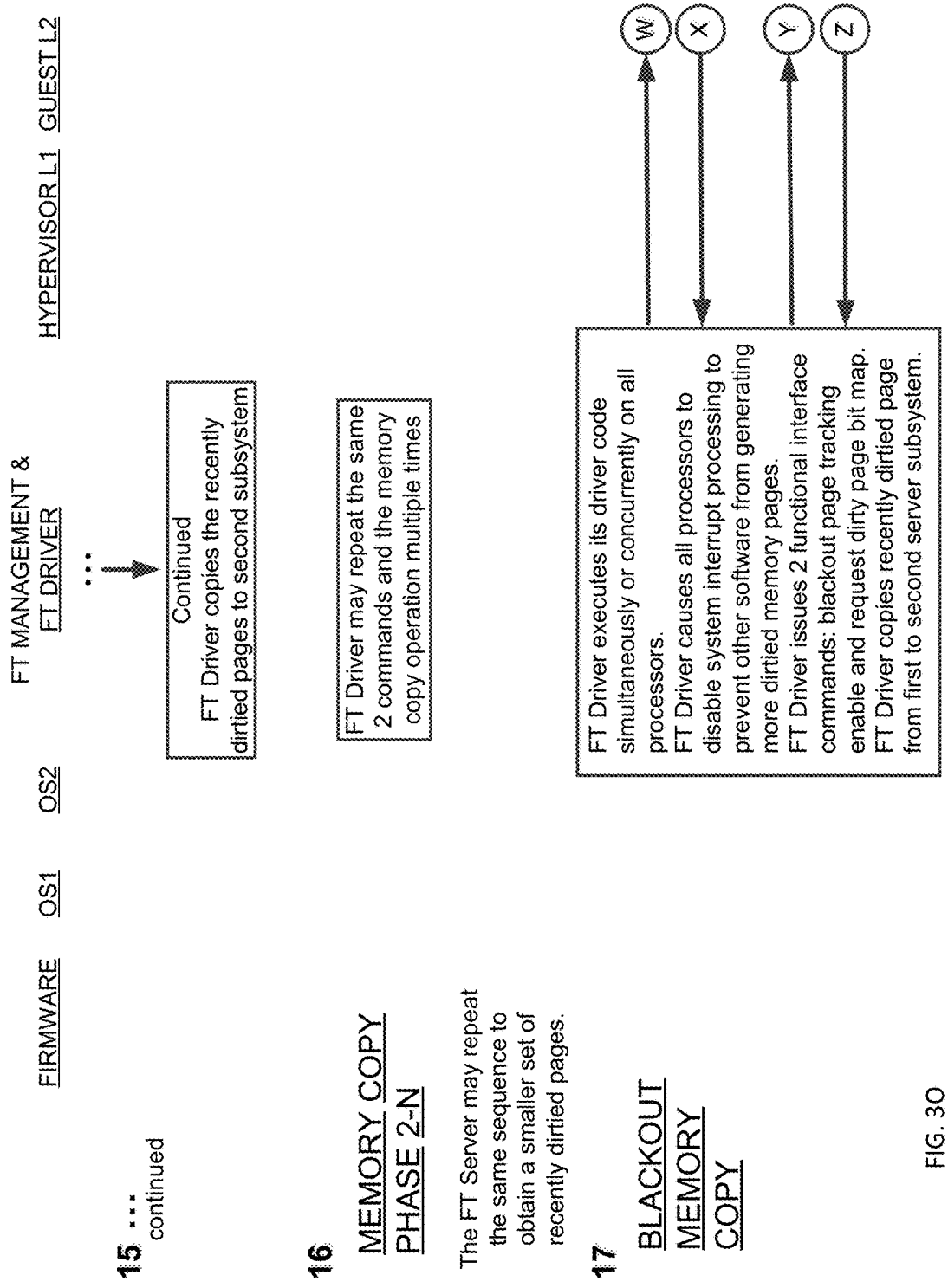
Figure 3P:
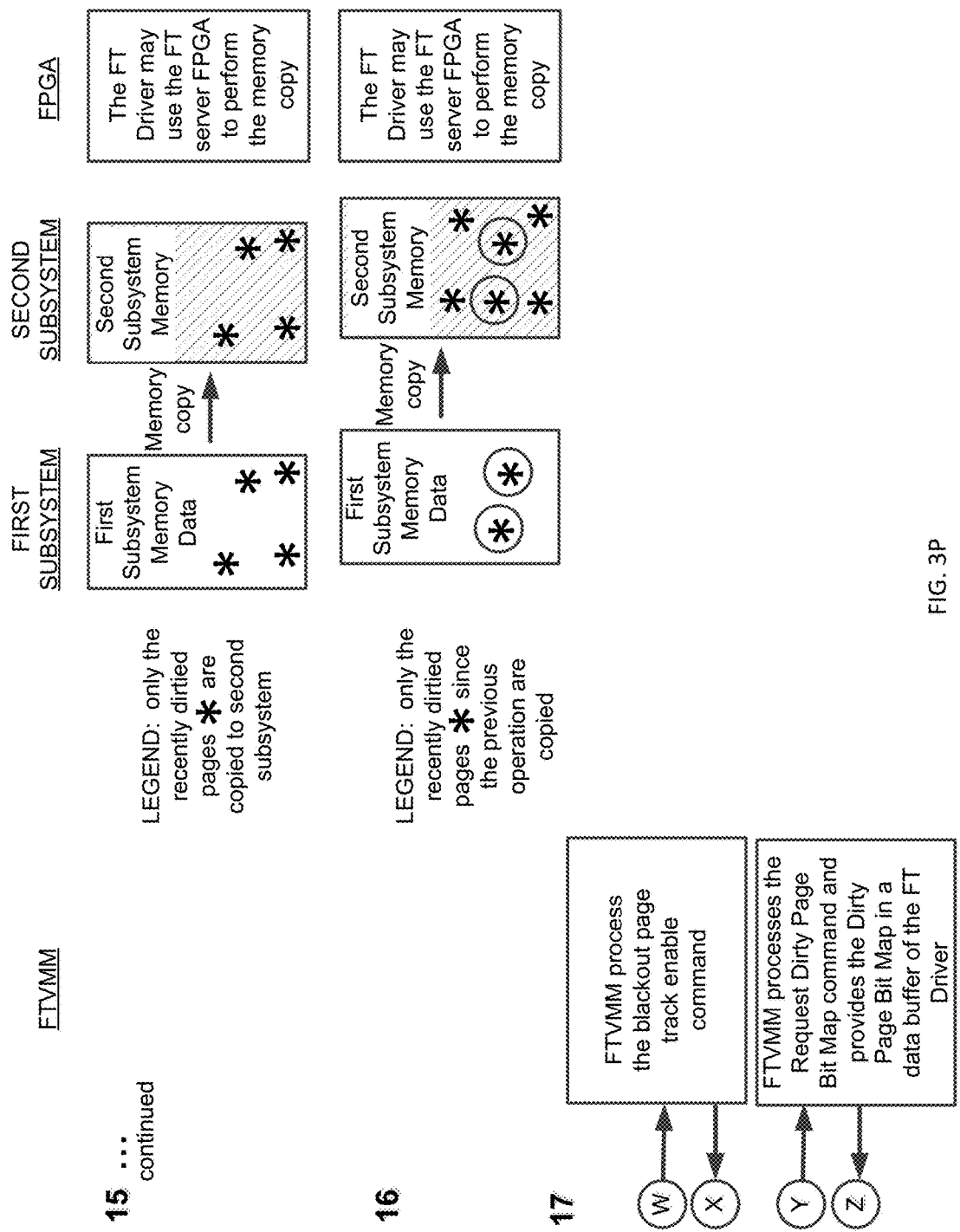
Figure 3Q:
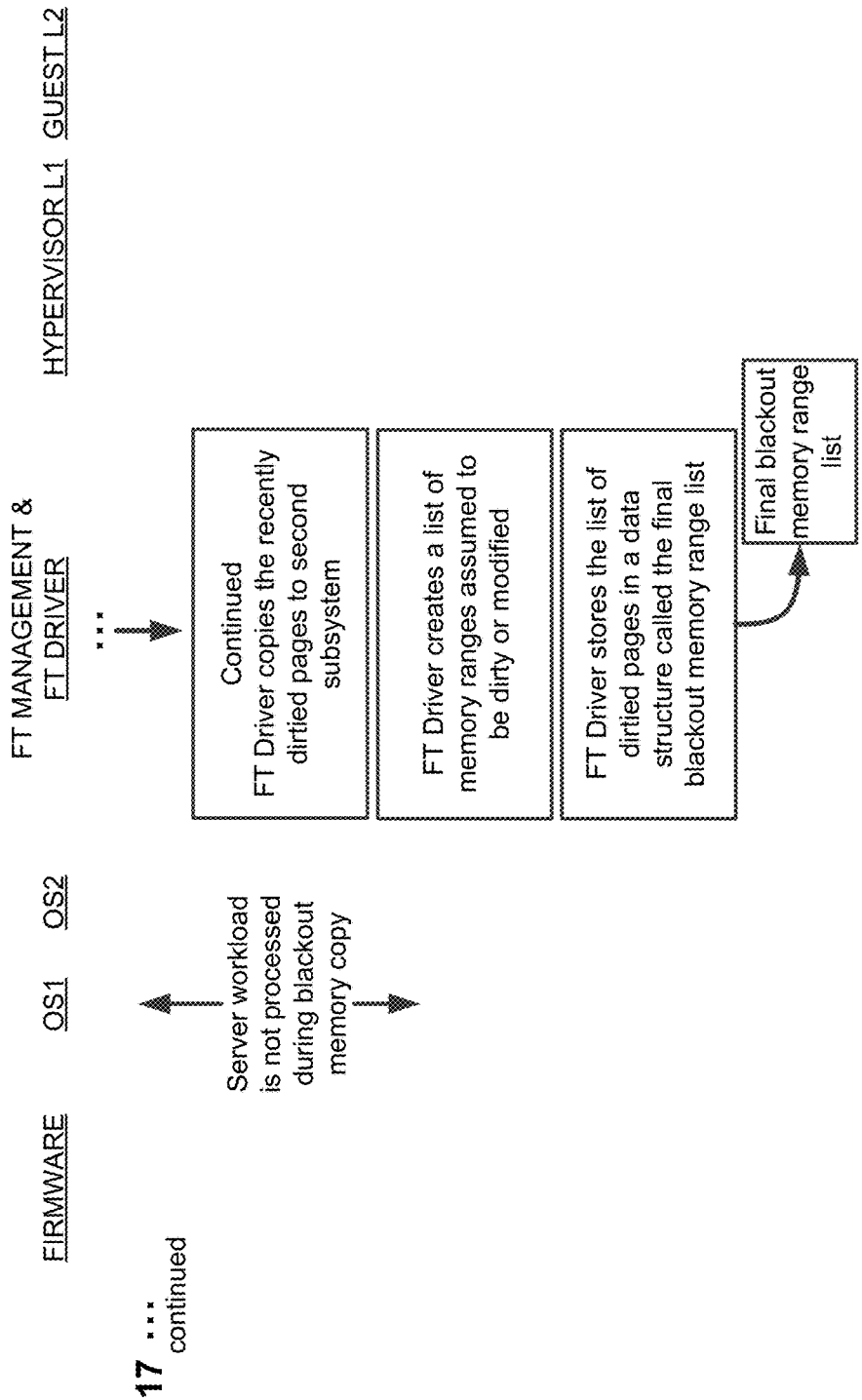
Figure 3R:
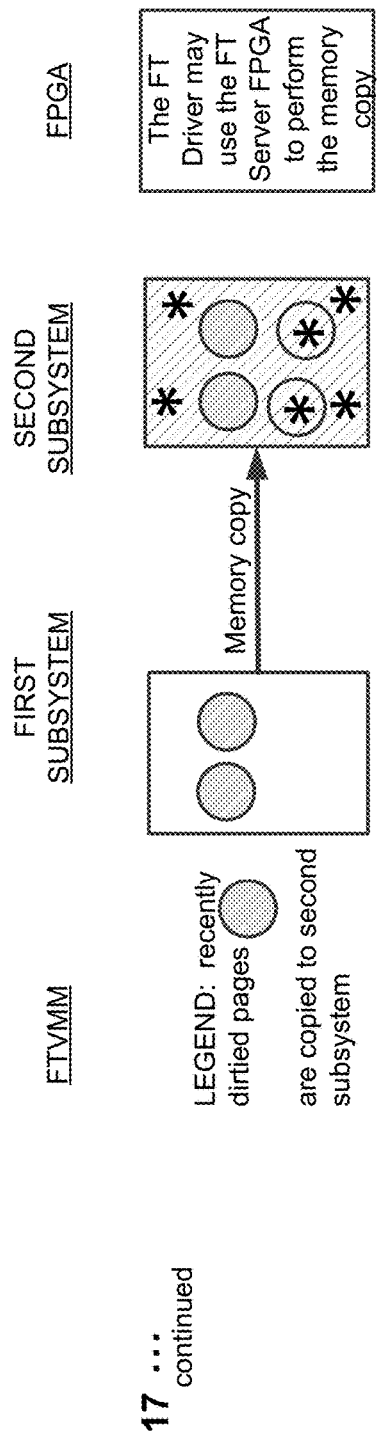
Figure 3S:
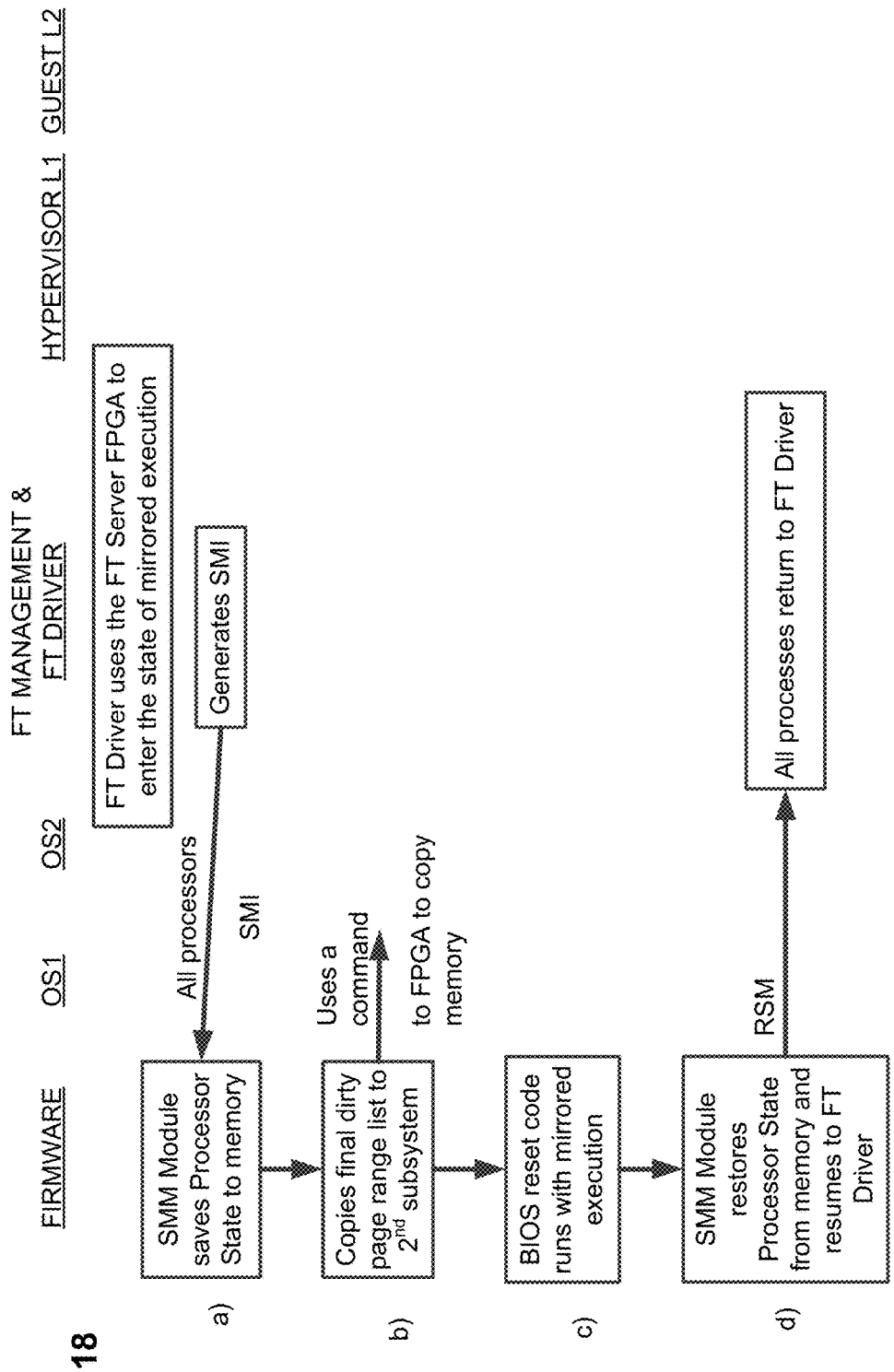
Figure 3T:
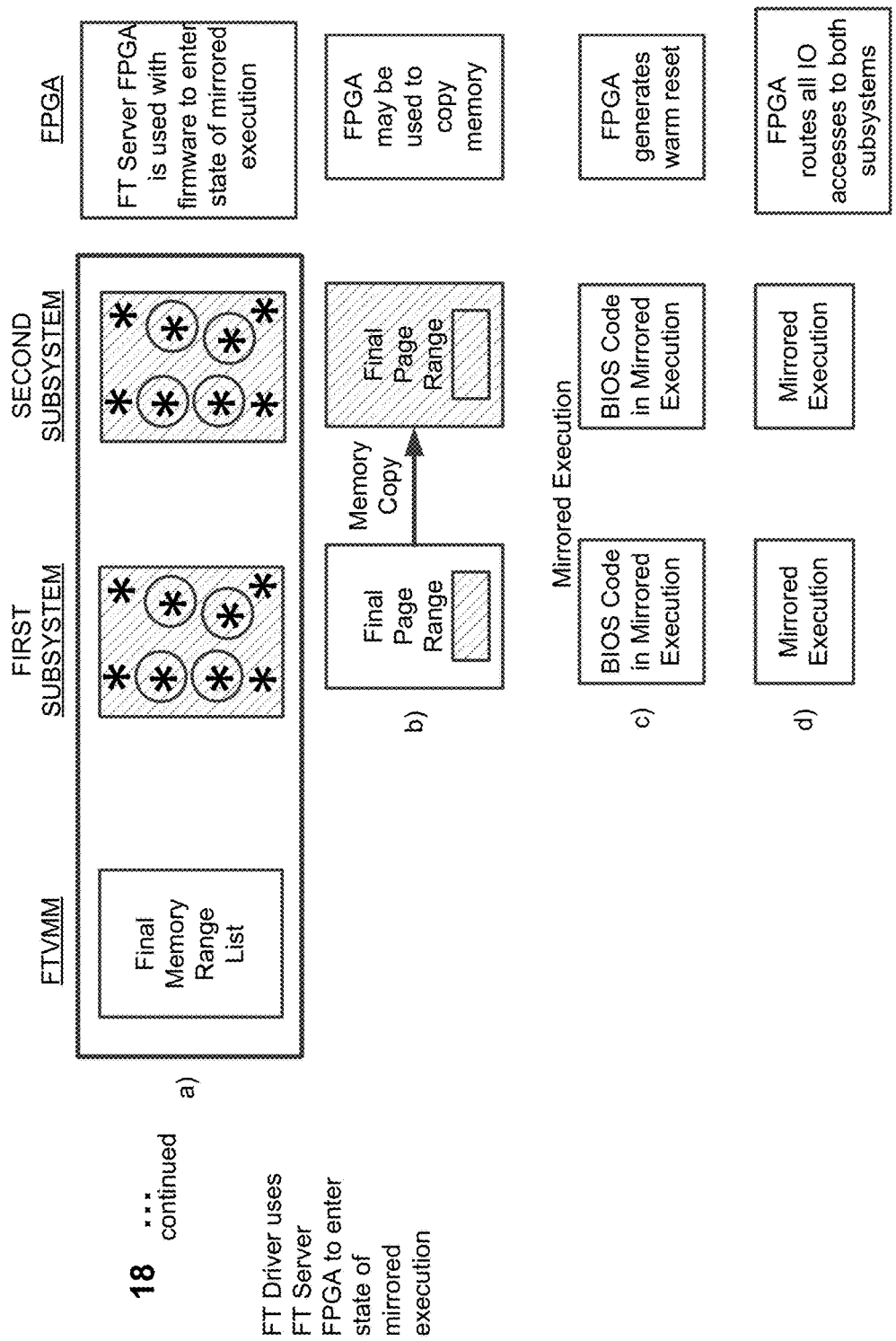
Figure 3V:
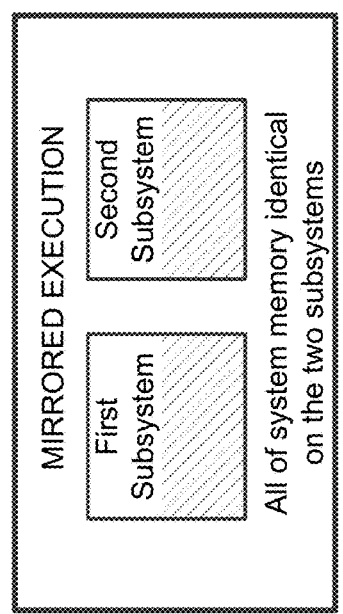
Figure 3W:
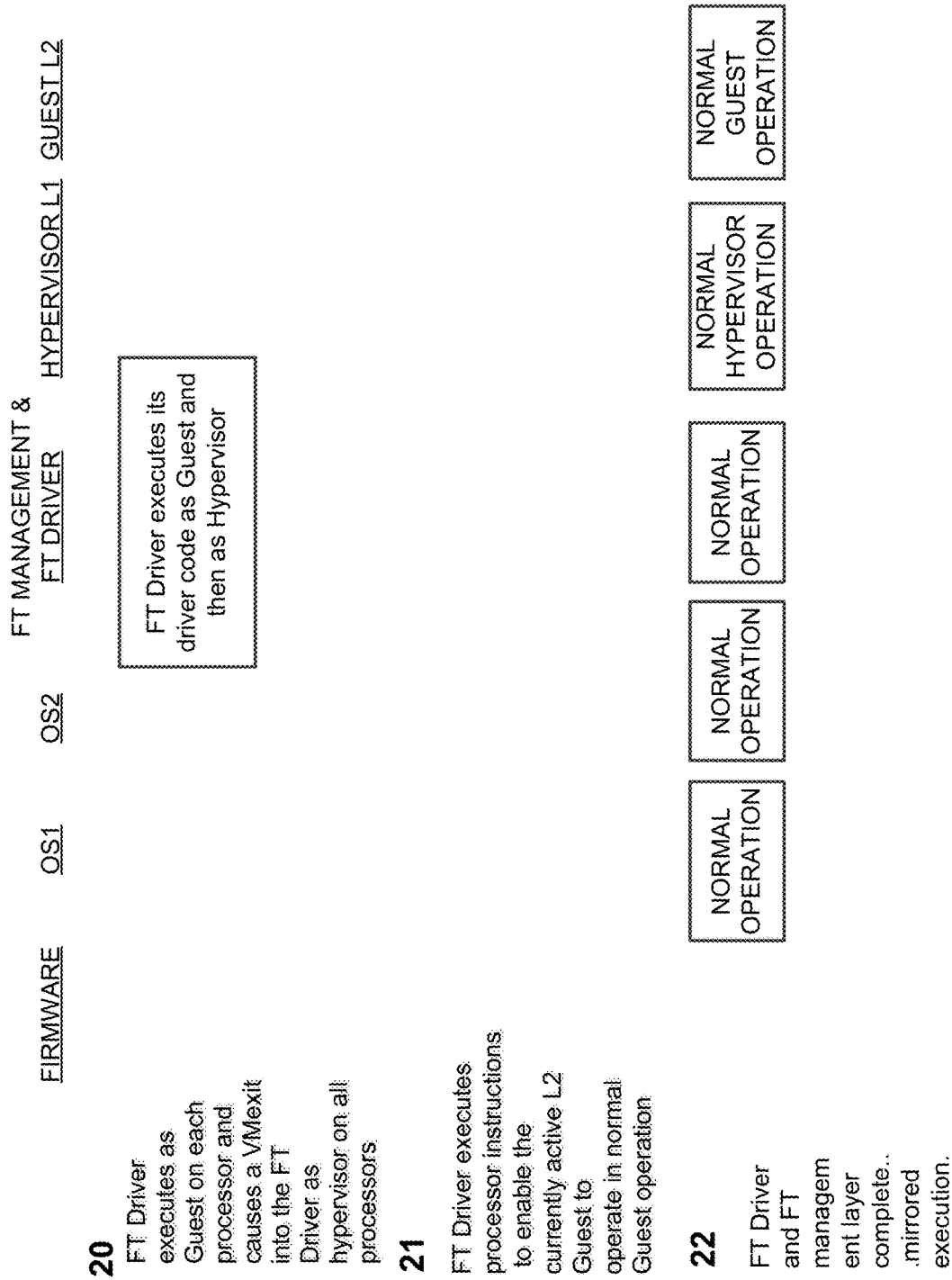

Step 11—FTVMM Operates as the Hypervisor for all Software Programs in the FTSERVER, and all Software Programs in the FT Server Operate as Guests of the FTVMM The FTVMM operates as the lowest level (or possibly the only) Hypervisor, and it handles all VMEXIT events in the system for as long as the FTVMM remains active. The FTVMM will remain active until it completes the Dirty Bit Tracking functions for entering Mirrored Execution, or until an error is detected, followed by a logical Unload command from the functional command interface of the FT Driver. The FTVMM handles all VMEXIT events in the system by emulating or producing the equivalent system behavior that would have occurred if the FTVMM were not present. The FTVMM may directly perform a function that caused the VMEXIT and may generate the normally occurring data or state for that function. In the case of a VMEXIT from a Virtual Machine Guest L2, the FTVMM may create an emulated state for the context of the Hypervisor L1, and may perform VMPTRLD, VMRESUME, and other processor instructions to allow the Hypervisor L1 to indirectly service each VMEXIT from the Guest L2. The FTVMM uses the VMPTRLD instruction to provide the correct VMCS L0 or VMCS-N for these operations. This operating state, termed nested virtualization, in which the Hypervisor L1 indirectly services the VMEXIT from the Guest L2 is depicted in FIG. 2B and FIG. 31 as "Nested Operation", "Nested Hypervisor Operation", and "Nested Guest Operation".

The FTVMM may enable the Intel Page Modification Logging (PML) function in each VMCS L0 for processors such as the Intel Broadwell processor which support this feature, by performing a VMWRITE to the VMCS fields for the PML Address (PML log address) and PML Index, and setting the Enable PML execution control bit of the VMCS. The FTVMM may use the PML function to track the location and number of dirtied memory pages that each processor generates. The FTVMM may sometimes perform a timed delay loop such as a 100 microsecond delay when handling a VMEXIT caused by a PML Log Full event, to slow down (termed Throttle) a guest processing context that has generated a large number of dirtied pages, in order to produce a smaller set of dirtied pages in the Blackout memory copy phase.

While the FTVMM is active, the FT Server system is in the state depicted in FIG. 2B. Every code path, OS routine, driver, workload, or program configured on the FT Server is executing in a virtualized mode of operation (such as Intel VMX Non-Root Mode). The FTVMM handles all VMEXITS from code running on the FT Server by processing the VMEXIT, creating a resulting state closely equivalent to the state that would have occurred if the FTVMM were not present and active, and performing a VMRESUME or VMLAUNCH to resume executing the code path or processing flow which was interrupted by the VMEXIT into the FTVMM.

Step 12—FT-Driver Uses a Functional Interface to Manage and Communicate with the FTVMM While in the state depicted in FIG. 2B, the FT Kernel Mode Driver uses a functional interface which may perform the VMCALL instruction to send and receive commands to and data from the FTVMM, and to generate and obtain a bitmap of Dirty Memory Pages which are required to create and enter the Mirrored Execution state. To respond to these commands, FTVMM may determine the origin of every VMEXIT which is caused by a VMCALL processor instruction, and then interpret the VMCALL events from the FT Kernel Mode Driver as high-level functional commands. The functional interface uses a set of logical commands to perform functions termed Memory Page Tracking Enable, Blackout Page Tracking Enable, Request Dirty Page Bit Map, Request FTVMM Unload, and other functional commands that may be used to control FTVMM operations.

Step 13—FTVMM Extracts and Tracks the Current Slat Table Location of Each Guest L2, Termed Slat L2, by Obtaining the VMCS-N Physical Address of Each Virtual Machine Guest L2:

The FTVMM continues to collect and update its data that describes the set of memory pages that is currently occupied by the SLAT tables, termed SLAT L2, for all Guest L2 while the FTVMM is active. The system memory of the FT Server may contain one or more SLAT tables for each Virtual Machine Guest L2 that is present, termed SLAT L2 tables. The SLAT L2 tables reside in system memory, are created and modified by the Hypervisor L1, and are logically independent of the FTVMM. The FTVMM maintains a data array of SLAT L2 table pointers (such as Intel EPTP pointers) that are associated with each Virtual Machine Guest termed L2. The FTVMM maintains data structures that contain the location of all the SLAT L2 table's memory pages. The SLAT L2 table contains the memory mapping and the Page Table Entry Dirty-Bits for each memory page that has been allocated to the Guest L2. When the Hypervisor L1 modifies data in the SLAT L2 table for a Guest L2, the FTVMM tracks these changes in order to maintain a current memory map of the guest. The FTVMM may track these changes by clearing a write permission bit in the SLAT L0 page table entry that maps a physical memory page in the SLAT L2 table, so that the Hypervisor L1 will cause a VMEXIT if its code modifies that SLAT L2 page. Subsequently, when the FT Kernel Mode Driver later performs a VMCALL to request a new Dirty Page Bit Map, the SLAT L2 Table software tracking structures will be used for finding the Dirty Page Bits in the Dirty Page Bit Map for each Guest L2.

Step 14—in Brownout Memory Copy Phase 0, the FT Driver Copies all System Memory to the Second Subsystem The FT Kernel Mode Driver uses the VMCALL Functional Interface with the FTVMM to issue a command Memory Page Tracking Enable, to request the FTVMM to begin tracking all pages of modified memory in the system. The VMCALL processor instruction in the FT Driver's Functional Interface to the FTVMM causes each logical processor to enter the FTVMM and process the request issued by the FT Driver. The FTVMM performs a function on all processors to begin using its program code in the FTVMM hypervisor context in a manner which obtains a record of all system memory pages which have been newly modified (Dirty Pages). The FTVMM searches the SLAT L0 and all SLAT L2 tables, and sets the Dirty Bits in these tables to zero, and then invalidates the cached SLAT table mappings on each processor, as described in Step 15 below. When all processors have completed this function in the FTVMM, the FTVMM returns control to the FT Driver by performing a VMRESUME instruction. The FT Driver then copies all of system memory into the Second Subsystem. The FT Driver may use a DMA controller or the FT Server FPGA to perform a high speed memory transfer operation that copies all system memory into the Second Subsystem. The FT Server continues to perform its configured workload during this processing.

Step 15—in Brownout Memory Copy Phase 1, the FT Driver Obtains a Dirty Page Bit Map and Copies the Newly Dirtied Pages of Memory to the Second Subsystem The FT Kernel Mode Driver uses the Functional Interface to issue a command termed Memory Page Tracking Enable on each processor. The VMCALL processor instruction in the FT Driver's Functional Interface to the FTVMM causes each logical processor to enter the FTVMM and process the request issued by the FT Driver. The FTVMM performs a function on all processors to begin using its program code in the FTVMM hypervisor context in a manner which obtains a record of all system memory pages which have been newly modified (Dirty Pages). Then the FTVMM code on each processor searches every 8-byte Page Table Entry in the SLAT L0 table and in each guest's SLAT L2 table, and compares the Dirty Bit in each entry with the TRUE value of that bit. When the comparison result is TRUE, the FTVMM sets a bit field in a Dirty Page Bit Map, at a bit field address which represents the address of the dirty or modified page in physical memory, and then clears the Dirty Bit in the Page Table Entry. The memory mapping that is configured in the SLAT L0 has a page size of 4-Kbytes, so one bit in the Dirty Page Bit Map is set for each dirtied page found. The memory mapping that the Hypervisor L1 configured in the SLAT L2 tables may be larger than 4-Kbytes, and the FTVMM sets a consecutive series of bit fields in the Dirty Page Bit Map, such as 512 consecutive bit field entries for the case of a 2-Megabyte page size, when this occurs. When this process has been completed for the SLAT L0 and SLAT L2 tables, each processor performs a processor instruction to invalidate the processor's cached translations for the SLAT L0 and SLAT L2 tables (such as Intel processor instruction INVEPT), to enable the FTVMM to continue detecting new instances of dirtied pages that may be caused by the system workload. When all processors have completed this operation in FTVMM, the FTVMM returns control to the FT Driver by performing a VMRESUME instruction. The FT Driver then issues another VMCALL Functional Interface command termed Request Dirty Page Bit Map. The FTVMM then provides a Dirty Page Bit Map containing a record of the recently modified pages, and stores this data in a memory buffer located in a data area of the FT Driver. The FT Driver then copies the set of physical memory pages that are identified in the Dirty Page Bit Map into the corresponding physical memory addresses in the Second Subsystem. The FT Driver may use a DMA controller or the FT Server FPGA to perform a high speed memory transfer operation that copies the set of Dirtied Pages into the Second Subsystem.

Step 16—in Brownout Memory Copy Phase 2-N, the FT Driver May Repeat the Same Sequence to Obtain Another Dirty Page Bit Map and Copy the Newly Dirtied Pages to the Second Subsystem One or More Times The procedure MEMORY COPY PHASE 1 may be repeated one or more times in order to obtain a smaller resulting set of Dirtied Pages that may be generated by the system workload during the final Brownout Memory Copy Phase N.

Step 17—in Blackout Memory Copy, the FT Driver Executes Driver Code on all Processors Simultaneously or Concurrently and Copies the Final Set of Dirtied Pages to the Second Subsystem The FT Driver causes all processors to disable system interrupt processing on each processor so as to prevent other programs in the FT Server from generating more Dirty Page Bits. The FT Driver uses the VMCALL Functional Interface to issue a command, Blackout Page Tracking Enable, which causes the FTVMM to identify the set of recently dirtied memory pages and also causes the FTVMM to identify certain volatile or frequently modified memory pages such as the VMCS-N and SLAT L2, and include those pages in the set of dirtied pages. The FTVMM may temporarily pause all processors except processor #0 in the FTVMM. The FT Driver then issues another VMCALL Functional Interface command, Request Dirty Page Bit Map, to obtain the bit map of dirty pages. The FTVMM then provides a Dirty Page Bit Map containing a record of the recently modified pages, and stores this data in a memory buffer located in a data area of the FT Driver. The FT Driver then copies the set of physical memory pages that are identified in the Dirty Page Bit Map into the corresponding physical memory addresses in the Second Subsystem. The FT Driver then creates a list of memory ranges that are assumed to be dirty or modified, including a memory range for the Reserved Memory Region, and stores this information in a data structure termed the Final Blackout Memory Range List. This procedure is termed BLACKOUT MEMORY COPY because the system workload does not execute, and the workload experiences a short server processing outage while the final set of Dirtied Pages is being copied into the Second Subsystem.

Step 18—FT Driver Uses the FT Server Fpga and Firmware Smm Module to Enter the State of Mirrored Execution The FT Driver performs a sequence of programs and functions using the FT Server FPGA and other FT Server hardware and firmware resources to transition the FT Server into the state of highly reliable Mirrored Execution. This series of operations uses the Final Blackout Memory Range List to ensure that a final set of memory address ranges have been copied into the Second Subsystem when entering the state of Mirrored Execution.

a) The FT Driver generates a System Management Interrupt (SMI) to cause all processors to enter the Firmware SMI handler and operate in System Management Mode (SMM). All processors execute code in the Firmware SMM Module.
 b) One processor uses the FPGA to copy the set of dirty memory pages in the Final Blackout Memory Range List into the memory of the Second Subsystem. One processor uses an FPGA function to temporarily block or suspend all IO DMA reads, writes, and interrupt delivery. All processors write data that represents their current operating state, termed Saved State, in a software structure. The Saved State includes Local APIC (Advanced Programmable Interrupt Controller) State and the data for the current hardware virtualization state. All processors execute a program that clears their cached data, code, and memory mapping translations.

c) The FPGA generates a hardware reset termed Warm Reset that causes both Subsystems to execute their BIOS reset code termed Initial Instruction Fetch in the state of Mirrored Execution. The FPGA isolates the external hardware interface devices such as storage and network controllers and they are not reset. The BIOS firmware initializes multiprocessor operation and generates an SMI to cause all processors to enter the Firmware SMI Handler and operate in SMM mode.

d) All processors in SMM mode read the Saved State from a structure in main memory and use the data to restore the current operating state that existed before the Warm Reset. One processor uses the FPGA to re-enable and resume IO DMA accesses and interrupt delivery. The FPGA routes all IO DMA transactions to both server Subsystems so that they continue to receive identical data with identical timing from external 10 interfaces. All processors execute an RSM or Resume instruction to return to the FT Driver. The system continues to execute in the state of Mirrored Execution.

Step 19—FT Driver Executes Driver Code on all Processors Simultaneously or Concurrently and then Causes the FTVMM to Execute a Program to Unload the FTVMM on all Processors The FT Driver determines that the operation to enter the state of Mirrored Execution has completed its execution, and the FT Driver then synchronizes all processors by causing them to execute a function in the FT Driver program code. The FT Driver then uses the Functional Interface with the FTVMM to issue a command termed "Request FTVMM Unload". The VMCALL in the Functional Interface causes every processor to execute in the FTVMM, in a context determined by the Host Fields of the VMCS L0 of each processor. The FTVMM waits for all processors to enter the FTVMM and then executes a program to unload the FTVMM. The FTVMM writes the Host Fields of each VMCS-N of a Guest L2 with the most recent values of these logical fields which were generated by the Hypervisor L1 and monitored by the FTVMM. The FTVMM performs other operations which subsequently enable the Hypervisor L1 and the Guest L2 to operate in Normal Hypervisor Operation and Normal Guest Operation when the FTVMM has completed its processing. The FTVMM performs processor instructions such as VMCLEAR, VMPTRLD, VMWRITE, and other instructions to enable the FT Driver to execute in normal operation. The FTVMM performs a VMLAUNCH instruction on each processor, which causes the processor to terminate execution within the FTVMM and resume execution within the FT Driver. The FT Driver will execute as a Guest using the Guest Fields of the VMCS L0 after the FTVMM performs the VMLAUNCH instruction.

Step 20—FT Driver Executes as Guest on Each Processor and Causes a Vmexit into the FT Driver as Hypervisor on all Processors:

Each processor executes driver program code in the FT Driver, in a manner that is controlled by the Guest Fields of the processor's VMCS L0. Each processor executes an instruction that causes a VMEXIT event to occur. Each processor continues executing the same driver program code in the FT driver, in a manner that is controlled by the Host Fields of the VMCS L0.

Step 21—FT Driver Executes Processor Instructions to Enable the Currently Active L2 Guest to Operate in Normal Guest Operation Each processor performs instructions such as VMPTRLD with the VMCS-N of the currently active Guest L2 for that processor as operand of an instruction, to enable subsequent Normal Guest Operation for the Guest L2, if present. Each processor performs a sequence of instructions to write or generate a set of processor register settings and contents (such as general purpose processor registers, processor selector registers, other hardware-virtualization state such as intel VMXOFF or VMXON, and other elements of processor state and context) to enable subsequent Normal Operation of the FT Driver and other software that is present in the system.

Step 22—FT Driver and FT Management Layer Complete the Request for Mirrored Execution The FT Driver completes its execution on all processors so that the FT Server can continue to process the workload that is configured for the server and its guest virtual machines. This stage of FT Server operation is depicted in FIG. 2C. The FT Driver completes the function request that it received from the FT Management Layer, and returns a completion status for the request. The FT Management Layer handles the completion of its request and may generate a message in an event log buffer or other logging mechanism to indicate that the FT Server has entered the highly reliable state of Mirrored Execution.

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the present invention is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. A method of transferring memory from an active to a standby memory in an FT (Fault Tolerant) Server system comprising the steps of:
   Reserving a portion of memory using BIOS of the FT Server system;
   Loading and initializing an FT Kernel Mode Driver into memory;
   Loading and initializing an FT virtual machine Manager (FTVMM) including the Second Level Address Table (SLAT) into the reserved portion of memory and synchronizing all processors in the FTVMM;
   Tracking the OS (Operating System), driver, software and Hypervisor memory accesses using the FTVMM's SLAT in Reserved Memory;
   Tracking Guest VM (Virtual Machine) memory accesses by tracking all pages of the SLAT associated with the guest and intercepting the Hypervisor writes to memory pages that constitute the SLAT;
   Entering Brownout—level 0, by executing a full memory copy while keeping track of the dirty bits (D-Bits) in the SLAT to track memory writes by all software in the FT Server;
   Clearing all of the D-Bits in the FTVMM SLAT and each Guest's current SLAT;
   Entering Brownout of phases 1-4 tracking all D-Bits by:
   Collecting the D-Bits;
   Invalidating all processors cached translations for the FTVMM SLAT and each current Guest's SLAT;
   Copying the data of the modified memory pages from the active memory to the second Subsystem memory;
   Entering Blackout by pausing all the processors in the FTVMM, except Processor #0, and disabling interrupts in the FT Driver for processor #0;
   Copying the collected data from active to the mirror memory;
   Collecting the final set of recently dirtied pages including stack and volatile pages;
   Transferring the set of final pages to the mirror memory using an FPGA (Field Programmable Gate Array);
   Using the FT Server FPGA and Firmware SMM (System Management Module) to enter the state of Mirrored Execution;
   Completing the Blackout portion of the operation by terminating and unloading the FTVMM;
   Returning control to the FT Kernel Mode Driver; and
   Resuming normal FT System operation.

2. The method of claim 1 wherein FTVMM code remains in Reserved Memory following the resumption of normal FT System operation.

3. The method of claim 1 wherein the reserved memory is a memory region from ¼ GByte to 2.25 GByte of contiguous physical memory, located up to and including the maximum existing physical memory address in the FT Server.

4. The method of claim 1 wherein moving the data from the active memory uses an FPGA.

5. The method of claim 1 wherein the return of control to the FT Kernel Mode Driver is by the FT Kernel Mode Driver causing a VMEXIT event to occur.

6. The method of claim 1 wherein the FT Kernel Mode Driver returns to the condition of normal Guest VM operation on each processor by performing a VMPTRLD (Virtual Machine Pointer Load) instruction with the current guest VMCS (VM Control Structure) as an operand to make the current guest VMCS current and active.

7. The method of claim 1 where the collecting of D-bits is performed either periodically from the SLAT or continuously using Page Modification Logging (PML).

8. A method of transferring memory from an active to a standby memory in an FT (Fault Tolerant) Server system comprising the steps of:
   Reserving a portion of memory using BIOS of the FT Server system at boot time;
   Loading and initializing an FT Kernel Mode Driver;
   Loading and initializing an FT virtual machine Manager (FTVMM) including the SLAT into the reserved portion of memory and synchronizing all processors in the FTVMM;
   Tracking memory accesses using the SLAT in Reserved Memory;
   Entering Brownout—level 0, by executing a full memory copy while keeping track of the dirty bits (D-Bits) in the SLAT;
   Clearing all of the D-Bits in the SLAT;
   Entering Brownout of phases 1-4 tracking all D-Bits by:
   Collecting the D-Bits;
   Invalidating all processors cached translations for SLAT;
   Copying the data of the modified memory pages from the active memory to the second Subsystem memory;
   Entering Blackout by pausing all the processors in the FTVMM, except Processor #0, and disabling interrupts in the FT Driver for processor #0;
   Copying the collected data from active to the mirror memory;

Collecting the final set of recently dirtied pages;

Transferring the set of final pages to the mirror memory using an FPGA (Field Programmable Gate Array);

Using the FT Server FPGA and Firmware SMM to enter the state of Mirrored Execution;

Unloading the FTVMM and exiting into FT Kernel Mode Driver to cease operation of the FTVMM.

9. The method of claim 8 wherein synchronizing of all processors in the FTVMM causes FTVMM code to execute as hypervisor on all processors.

10. The method of claim 8 wherein the FTVMM tracks memory accesses using the SLAT in Reserved Memory.

11. The method of claim 8 wherein the full memory copy of system memory to the standby memory is performed by the FT Driver.

12. The method of claim 11, wherein the copying the data of the modified memory pages from the active memory to the second Subsystem memory begins with the FTVMM obtaining a copy of all pages dirtied during the full memory copy by the FT Driver.

13. The method of claim 12, wherein the FTVMM provides dirty page bit map data to the FT Driver.

14. The method of claim 13, wherein the providing of the dirty page bit map to the FT Driver occurs for any pages dirtied during the previous copying of dirty page data by the FT Driver.

15. The method of claim 8, wherein the SMM enters the state of Mirrored Execution by restoring Processor State from memory.

16. The method of claim 15, wherein the SMM returns to the FT Driver after Processor State is restored, completing entrance into Mirrored Execution.

17. The method of claim 8 where the collecting of D-bits is performed either periodically from the SLAT or continuously using PML.

* * * * *